(12) United States Patent
Opshaug et al.

(10) Patent No.: US 8,677,440 B2
(45) Date of Patent: *Mar. 18, 2014

(54) POSITION DETERMINATION USING ATSC-M/H SIGNALS

(75) Inventors: Guttorm Opshaug, Redwood City, CA (US); Andy Lee, Union City, CA (US); Dimitri Rubin, Cupertino, CA (US); James J. Spilker, Jr., Woodside, CA (US); Matthew Rabinowitz, Portola Valley, CA (US)

(73) Assignee: TruePosition, Inc., Berwyn, PA (US)

( * ) Notice: Subject to any disclaimer, the term of this patent is extended or adjusted under 35 U.S.C. 154(b) by 507 days.

This patent is subject to a terminal disclaimer.

(21) Appl. No.: 12/693,283

(22) Filed: Jan. 25, 2010
(Under 37 CFR 1.47)

(65) Prior Publication Data

US 2011/0025561 A1 Feb. 3, 2011

Related U.S. Application Data

(63) Continuation-in-part of application No. 10/867,577, filed on Jun. 14, 2004, now abandoned, which is a continuation-in-part of application No. 10/810,847, filed on Jul. 31, 2002, now Pat. No. 6,861,984, which is a continuation-in-part of application No. 09/887,158, filed on Jun. 21, 2001, now abandoned.

(60) Provisional application No. 60/265,675, filed on Feb. 2, 2001, provisional application No. 60/281,270, filed on Apr. 3, 2001, provisional application No. 60/281,269, filed on Apr. 3, 2001, provisional application No. 60/293,812, filed on May 25, 2001, provisional application No. 60/293,813, filed on May 25, 2001, provisional application No. 60/293,646, filed on May 25, 2001, provisional application No. 61/147,201, filed on Jan. 26, 2009.

(51) Int. Cl.
*H04N 7/173* (2011.01)

(52) U.S. Cl.
USPC ............ 725/126; 725/118; 342/450; 342/464

(58) Field of Classification Search
None
See application file for complete search history.

(56) References Cited

U.S. PATENT DOCUMENTS

| 4,555,707 A | 11/1985 | Connelly |
| 4,652,884 A | 3/1987 | Starker |

(Continued)

FOREIGN PATENT DOCUMENTS

| DE | 3242997 A1 | 5/1984 |
| EP | 58129277 | 8/1983 |

(Continued)

OTHER PUBLICATIONS

U.S. Appl. No. 10/008,613, Pierce, et al.

(Continued)

*Primary Examiner* — Cai Chen
(74) *Attorney, Agent, or Firm* — Woodcock Washburn LLP

(57) ABSTRACT

Apparatus to determine the position of a user terminal, the apparatus having corresponding methods and computer-readable media, comprise: a receiver to receive at the user terminal an American Television Standards Committee Mobile/Handheld (ATSC-M/H) broadcast signal from a ATSC-M/H transmitter; and a pseudorange module to determine a pseudorange between the receiver and the ATSC-M/H transmitter based on the ATSC-M/H) broadcast signal; wherein the position module determines the position of the user terminal based on the pseudorange and a location of the ATSC-M/H transmitter.

41 Claims, 15 Drawing Sheets

(56) References Cited

U.S. PATENT DOCUMENTS

| | | | |
|---|---|---|---|
| 4,700,306 A | 10/1987 | Wallmander |
| 4,894,662 A | 1/1990 | Counselman |
| 5,045,861 A | 9/1991 | Duffett-Smith |
| 5,157,686 A | 10/1992 | Omura et al. |
| 5,166,952 A | 11/1992 | Omura et al. |
| 5,271,034 A | 12/1993 | Abaunza |
| 5,323,322 A | 6/1994 | Mueller et al. |
| 5,398,034 A | 3/1995 | Spilker, Jr. |
| 5,481,316 A | 1/1996 | Patel |
| 5,504,492 A | 4/1996 | Class et al. |
| 5,510,801 A | 4/1996 | Engelbrecht et al. |
| 5,604,765 A | 2/1997 | Bruno et al. |
| 5,630,206 A | 5/1997 | Urban et al. |
| 5,648,982 A | 7/1997 | Durrant et al. |
| 5,774,829 A | 6/1998 | Cisneros et al. |
| 5,784,339 A | 7/1998 | Woodsum et al. |
| 5,835,060 A | 11/1998 | Czarnecki et al. |
| 5,920,284 A | 7/1999 | Victor |
| 5,952,958 A | 9/1999 | Speasl et al. |
| 5,953,311 A | 9/1999 | Davies et al. |
| 6,006,097 A | 12/1999 | Hornfeldt et al. |
| 6,016,119 A | 1/2000 | Krasner |
| 6,078,284 A | 6/2000 | Levanon |
| 6,094,168 A | 7/2000 | Duffett-Smith et al. |
| 6,107,959 A | 8/2000 | Levanon |
| 6,137,441 A | 10/2000 | Dai et al. |
| 6,144,413 A | 11/2000 | Zatsman |
| 6,147,642 A | 11/2000 | Perry et al. |
| 6,181,921 B1 | 1/2001 | Konisi et al. |
| 6,184,921 B1 | 2/2001 | Limberg |
| 6,201,497 B1 | 3/2001 | Snyder et al. |
| 6,215,778 B1 | 4/2001 | Lomp et al. |
| 6,289,280 B1 | 9/2001 | Fernandez-Corbaton et al. |
| 6,317,452 B1 | 11/2001 | Durrant et al. |
| 6,317,500 B1 | 11/2001 | Murphy |
| 6,373,432 B1 | 4/2002 | Rabinowitz et al. |
| 6,374,177 B1 | 4/2002 | Lee et al. |
| 6,400,753 B1 | 6/2002 | Kohli et al. |
| 6,433,740 B1 | 8/2002 | Gilhousen |
| 6,437,832 B1 | 8/2002 | Grabb et al. |
| 6,484,034 B1 | 11/2002 | Tsunehara et al. |
| 6,522,297 B1 | 2/2003 | Rabinowitz et al. |
| 6,559,800 B2 | 5/2003 | Rabinowitz et al. |
| 6,559,894 B2 | 5/2003 | Omura et al. |
| 6,590,529 B2 | 7/2003 | Schwoegler |
| 6,646,603 B2 | 11/2003 | Dooley et al. |
| 6,717,547 B2 | 4/2004 | Spilker, Jr. et al. |
| 6,727,847 B2 | 4/2004 | Rabinowitz et al. |
| 6,753,812 B2 | 6/2004 | Rabinowitz et al. |
| 6,806,830 B2 | 10/2004 | Panasik et al. |
| 6,839,024 B2 | 1/2005 | Spilker, Jr. et al. |
| 6,859,173 B2 | 2/2005 | Spilker, Jr. et al. |
| 6,861,984 B2 | 3/2005 | Rabinowitz et al. |
| 6,879,286 B2 | 4/2005 | Rabinowitz et al. |
| 6,914,560 B2 | 7/2005 | Spilker, Jr. et al. |
| 6,917,328 B2 | 7/2005 | Rabinowitz et al. |
| 6,937,866 B2 | 8/2005 | Duffett-Smith et al. |
| 6,952,182 B2 | 10/2005 | Spilker, Jr. et al. |
| 6,961,020 B2 | 11/2005 | Rabinowitz et al. |
| 6,963,306 B2 | 11/2005 | Spilker, Jr. et al. |
| 6,970,132 B2 | 11/2005 | Spilker, Jr. et al. |
| 7,042,396 B2 | 5/2006 | Omura et al. |
| 7,042,949 B1 | 5/2006 | Omura et al. |
| 7,126,536 B2 | 10/2006 | Rabinowitz et al. |
| 7,260,378 B2 | 8/2007 | Holland et al. |
| 7,269,424 B2 | 9/2007 | Camp, Jr. |
| 7,372,405 B2 | 5/2008 | Rabinowitz et al. |
| 7,463,195 B2 | 12/2008 | Rabinowitz et al. |
| 7,466,266 B2 | 12/2008 | Opshaug |
| 7,471,244 B2 | 12/2008 | Omura et al. |
| 2002/0122003 A1 | 9/2002 | Patwari et al. |
| 2002/0168988 A1 | 11/2002 | Younis |
| 2002/0184653 A1 | 12/2002 | Pierce et al. |
| 2003/0052822 A1* | 3/2003 | Rabinowitz et al. .......... 342/464 |
| 2003/0162547 A1 | 8/2003 | McNair |
| 2004/0073914 A1 | 4/2004 | Spilker et al. |
| 2004/0201779 A1 | 10/2004 | Spilker et al. |
| 2005/0066373 A1 | 3/2005 | Rabinowitz et al. |
| 2005/0251844 A1 | 11/2005 | Martone et al. |
| 2007/0050824 A1 | 3/2007 | Lee et al. |
| 2007/0121555 A1 | 5/2007 | Burgess et al. |
| 2007/0131079 A1 | 6/2007 | Opshaug et al. |
| 2009/0070847 A1 | 3/2009 | Furman et al. |
| 2009/0175379 A1 | 7/2009 | Rubin et al. |
| 2010/0034522 A1* | 2/2010 | Ng et al. ........................ 386/124 |
| 2011/0016494 A1* | 1/2011 | Linhardt ......................... 725/62 |

FOREIGN PATENT DOCUMENTS

| | | |
|---|---|---|
| GB | 2 222 922 A | 3/1990 |
| GB | 2 254 508 A | 10/1992 |

OTHER PUBLICATIONS

U.S. Appl. No. 11/380,691, Metzler, et al.
U.S. Appl. No. 11/535,485, Furman, et al.
U.S. Appl. No. 11/622,838, Rabinowitz, et al.
U.S. Appl. No. 11/770,162, Furman, et al.
U.S. Appl. No. 11/865,881, Opshaug, et al.
U.S. Appl. No. 12/117,676, Rabinowitz, et al.
U.S. Appl. No. 12/209,971, Do, et al.
U.S. Appl. No. 12/263,731, Rabinowitz, et al.
U.S. Appl. No. 12/351,841, Lee, et al.
U.S. Appl. No. 12/476,992, Do, et al.
U.S. Appl. No. 12/578,456, Opshaug, et al.
U.S. Appl. No. 12/582,051, Opshaug, et al.
Parkinson, B.W., et al., "Autonomous GPS Integrity Monitoring Using the Pseudorange Residual," *Journal of the Institute of Navigation* (1988), vol. 35, No. 2, pp. 255-274.
Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59-73.
Spilker, Jr., J.J., "Fundamentals of Signal Tracking Theory," *Global Positioning System: Theory and Applications* (1994), vol. 1, Chapter 7, pp. 245-327.
Van Dierendock, A.J., "GPS Receivers," *Global Positioning System: Theory and Applications* (1995), vol. 1, Chapter 8, pp. 329-407.
Li, X., et al., "Indoor Geolocation Using OFDM Signals in HIPERLAN/2 Wireless LANS," 11$^{th}$ IEEE International Symposium on Personal Indoor and Mobile Radio Communications, PIMRC 2000, Proceedings (Cat. No. 00TH8525), Proceedings of 11$^{th}$ International Symposium on Personal Indoor and Mobile Radio Communication, London, UK, Sep.. 18-21, pp. 1449-1453, vol. 2, XP010520871, 2000, Piscataway, NJ, USA, IEEE, USA, ISBN; 9-7803-6463-5, Chapter I and III.
Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.

* cited by examiner

POSITION DETERMINATION USING ATSC-M/H SIGNALS

CROSS-REFERENCE TO RELATED APPLICATIONS

This application is a CIP of Ser. No. 10/867,577 Jun. 14, 2004
which is a CIP of Ser. No. 10/210,847 Jul. 31, 2002 now U.S. Pat. No. 6,861,984
which is a CIP of Ser. No. 09/887,158 Jun. 21, 2001 ABN
which claims the benefit of 60/265,675 Feb. 2, 2001
which claims the benefit of 60/281,270 Apr. 3, 2001
which claims the benefit of 60/281,269 Apr. 3, 2001
which claims the benefit of 60/293,812 May 25, 2001
which claims the benefit of 60/293,813 May 25, 2001
which claims the benefit of 60/293,646 May 25, 2001.
This application claims the benefit of 61147201 Jan. 26, 2009.

The disclosures of all of the above are incorporated by reference herein in their entirety.

BACKGROUND

The present disclosure relates generally to position determination. More particularly, the present disclosure relates to position determination using ATSC-M/H signals.

SUMMARY

In general, in one aspect, an embodiment features an apparatus to determine the position of a user terminal, comprising: a receiver to receive at the user terminal an American Television Standards Committee Mobile/Handheld (ATSC-M/H) broadcast signal from a ATSC-M/H transmitter; and a pseudorange module to determine a pseudorange between the receiver and the ATSC-M/H transmitter based on the ATSC-M/H) broadcast signal; wherein the position module determines the position of the user terminal based on the pseudorange and a location of the ATSC-M/H transmitter.

Embodiments of the apparatus can include one or more of the following features. Some embodiments comprise a position module to determine the position of the user terminal based on the pseudorange and a location of the ATSC-M/H transmitter. In some embodiments, the ATSC-M/H broadcast signal includes a training sequence; and the pseudorange module determines the pseudorange based on the training sequence. In some embodiments, to determine the position of the user terminal, the position module determines an offset between a local time reference in the user terminal and a master time reference, and determines the position of the user terminal based on the pseudorange, the location of the ATSC-M/H transmitter, and the offset. In some embodiments, the pseudorange module comprises: a memory to store a portion of the ATSC-M/H broadcast signal; and a correlator to correlate the stored portion with a signal generated by the user terminal. In some embodiments, the pseudorange module comprises: a correlator to correlate the ATSC-M/H broadcast signal with a signal generated by the user terminal as the ATSC-M/H broadcast signal is received. Some embodiments comprise the apparatus of claim 1.

In general, in one aspect, an embodiment features a method for determining the position of a user terminal, comprising: receiving at the user terminal an American Television Standards Committee Mobile/Handheld (ATSC-M/H) broadcast signal from a ATSC-M/H transmitter; and determining a pseudorange between the receiver and the ATSC-M/H transmitter based on the ATSC-M/H) broadcast signal; wherein the position of the user terminal is determined based on the pseudorange and a location of the ATSC-M/H transmitter.

Embodiments of the method can include one or more of the following features. Some embodiments comprise determining the position of the user terminal based on the pseudorange and a location of the ATSC-M/H transmitter. In some embodiments, the ATSC-M/H broadcast signal includes a training sequence; and the pseudorange is determined based on the training sequence. In some embodiments, determining the position of the user terminal comprises determining an offset between a local time reference in the user terminal and a master time reference, and determining the position of the user terminal based on the pseudorange, the location of the ATSC-M/H transmitter, and the offset. Some embodiments comprise storing a portion of the ATSC-M/H broadcast signal; and correlating the stored portion with a signal generated by the user terminal. Some embodiments comprise correlating the ATSC-M/H broadcast signal with a signal generated by the user terminal as the ATSC-M/H broadcast signal is received.

In general, in one aspect, an embodiment features computer-readable media embodying instructions executable by a computer to perform a method for determining the position of a user terminal, the method comprising: determining a pseudorange between a receiver and a American Television Standards Committee Mobile/Handheld (ATSC-M/H) transmitter based on a ATSC-M/H broadcast signal received at the user terminal from the ATSC-M/H transmitter; wherein the position of the user terminal is determined based on the pseudorange and a location of the ATSC-M/H transmitter.

Embodiments of the computer-readable media can include one or more of the following features. Some embodiments comprise determining the position of the user terminal based on the pseudorange and a location of the ATSC-M/H transmitter. In some embodiments, the ATSC-M/H broadcast signal includes a training sequence; and the pseudorange is determined based on the training sequence. In some embodiments, determining the position of the user terminal comprises determining an offset between a local time reference in the user terminal and a master time reference, and determining the position of the user terminal based on the pseudorange, the location of the ATSC-M/H transmitter, and the offset. Some embodiments comprise storing a portion of the ATSC-M/H broadcast signal; and correlating the stored portion with a signal generated by the user terminal. Some embodiments comprise correlating the ATSC-M/H broadcast signal with a signal generated by the user terminal as the ATSC-M/H broadcast signal is received.

The details of one or more implementations are set forth in the accompanying drawings and the description below. Other features will be apparent from the description and drawings, and from the claims.

Figure 1:
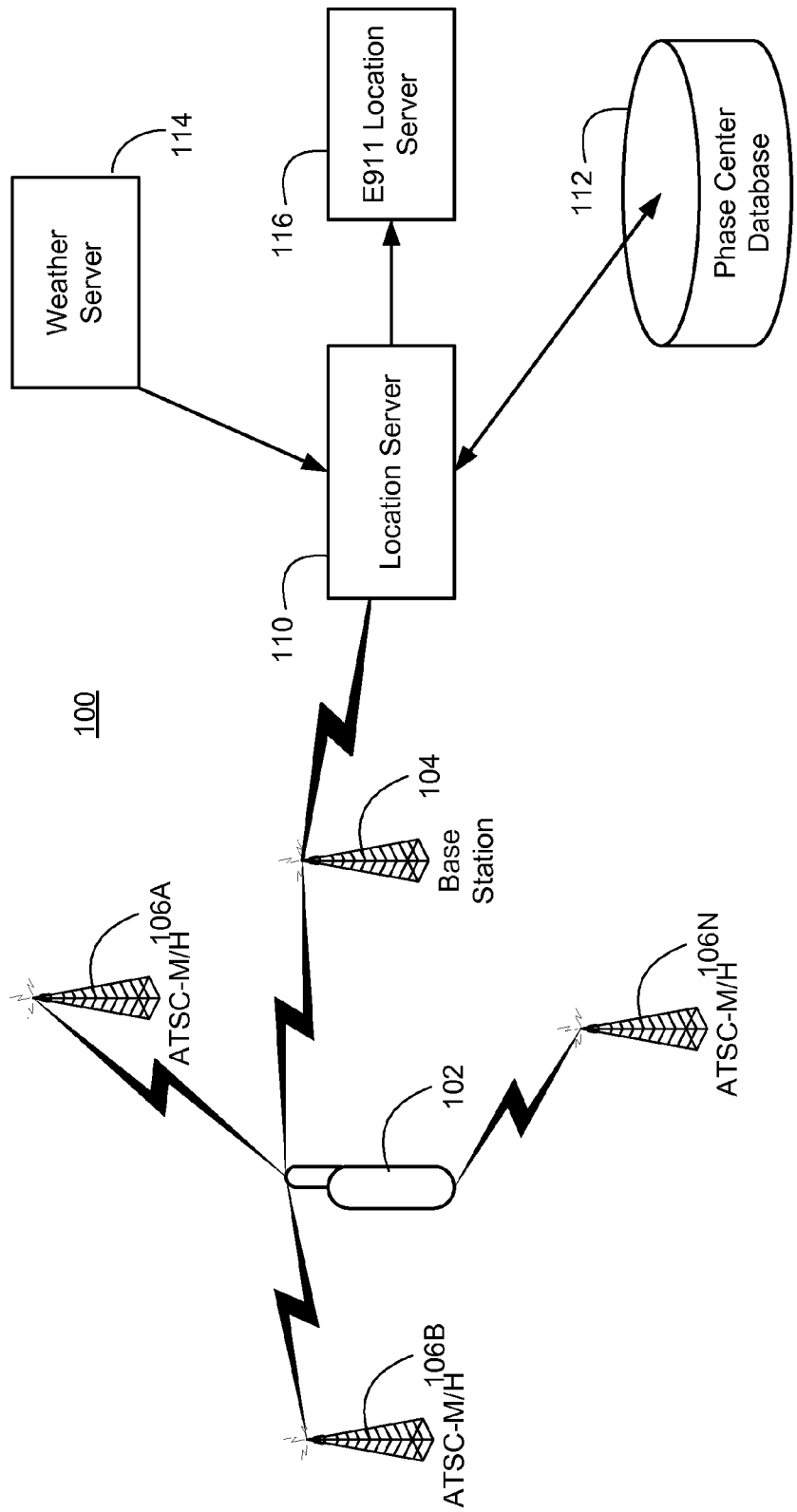
FIG. 1 depicts an implementation of the present invention including a user terminal that communicates over an air link with a base station.

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices such as special-purpose computers and the like.

Embodiments disclosed herein provide positioning in a range of connected devices that must operate in inclement urban conditions. These devices include micro-cells for extending cellular networks to indoor environments, PDAs, laptops, cellular phones, asset tracking devices, radios for emergency response personnel, and the like. The techniques disclosed make use of synchronization signals that are part of the standard for mobile television set forth by the American Television Standards Committee (ATSC). Consequently, the techniques described herein require no changes to the television broadcast stations. The signal can accommodate robust indoor positioning where the Global Positioning System (GPS) fails, because the synchronization signals typically have a power advantage over GPS of more than 40 dB. In addition, the effects of multipath are substantially mitigated because the signals have a bandwidth of roughly 6 MHz, and substantially superior geometry for triangulating lateral position to that which GPS can provide.

A wide range of VHF and UHF frequencies have been allocated to television stations; consequently, there is redundancy built into the system to protect against deep fades on particular channels. In addition, unlike GPS, the synchronization signals are not affected by transmitter Doppler, ionospheric propagation delays, or data that is modulated onto the signals. These techniques are not limited to ATSC signals, but may be applied to a wider range of television and other broadcast signals that include known synchronization components for which the time of arrival at a receiver can be measured. In overview, the technology exploits the considerable TV infrastructure to achieve more reliable, accurate and rapid positioning than can be achieved with existing technologies.

The power of the TV signal, combined with the large number of available TV stations, makes it suitable for position location of connected devices throughout most of the United States, Europe, and Asia. The TV signals are at low frequencies well-suited for urban propagation, have bandwidths of 6 MHz or greater, and do not suffer from the Ionospheric and Doppler effects which hinder the performance of GPS.

The techniques disclosed herein employ the ATSC-M/H (Advanced Television Systems Committee—Mobile/Handheld) signal for location and time transfer. The ATSC-M/H signal is intended for delivery of TV broadcasts to mobile and handheld devices, and is described in the A/153 standards produced by the ATSC, which are incorporated by reference herein.

Referring to FIG. 1, an example implementation 100 includes a user terminal 102 that communicates over an air link with a base station 104 and location server 110. In one implementation, user terminal 102 is a wireless telephone and base station 104 is a wireless telephone base station. In one implementation, base station 104 is part of a mobile MAN (metropolitan area network) or WAN (wide area network). In other implementations, user terminal 102 can be a wired device with a wired connection to location server 110.

FIG. 1 is used to illustrate various aspects of the invention but the invention is not limited to this implementation. For example, the phrase "user terminal" is meant to refer to any object capable of implementing the position location techniques described herein. Examples of user terminals include PDAs, mobile phones, cars and other vehicles, and any object which could include a chip or software implementing the described position location techniques. It is not intended to be limited to objects which are "terminals" or which are operated by "users."

Position Location Performed by a Location Server

Figure 2:
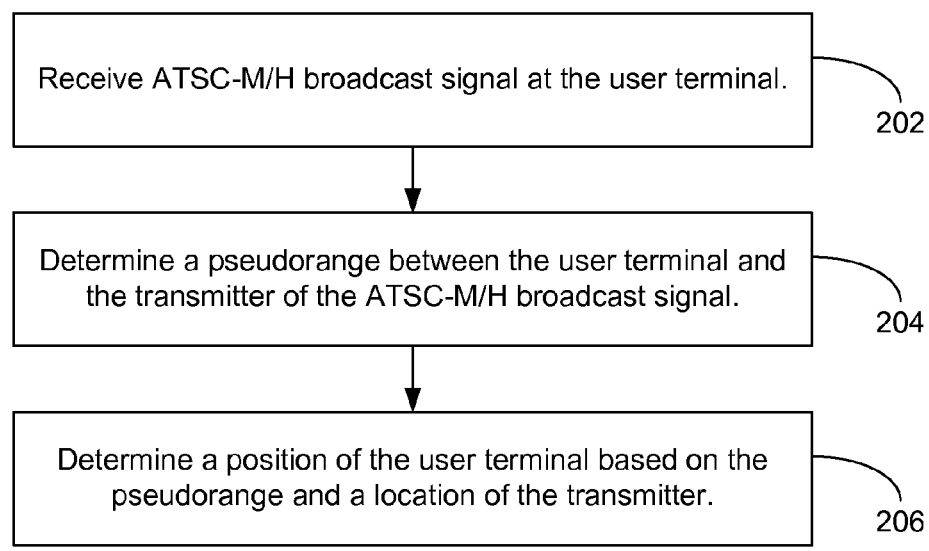
FIG. 2 illustrates an operation of an implementation of the invention.

FIG. 2 illustrates an operation of implementation 100 of FIG. 1. Referring to FIG. 2, user terminal 102 receives a ATSC-M/H signal from a ATSC-M/H transmitter 106 (step 202).

Various methods can be used to select which ATSC-M/H channels to use in position location. In one implementation, a location server 110 tells user terminal 102 of the best ATSC-M/H channels to monitor. In one implementation, user terminal 102 exchanges messages with location server 110 by way of base station 104. In one implementation user terminal 102 selects ATSC-M/H channels to monitor based on the identity of base station 104 and a stored table correlating base stations and ATSC-M/H channels. In another implementation, user terminal 102 can accept a location input from the user that gives a general indication of the area, such as the name of the nearest city, and uses this information to select ATSC-M/H channels for processing. In one implementation, user terminal 102 scans available ATSC-M/H channels to assemble a fingerprint of the location based on power levels of the available ATSC-M/H channels. User terminal 102 compares this fingerprint to a stored table that matches known fingerprints with known locations to select ATSC-M/H channels for processing.

User terminal 102 determines a pseudorange between the user terminal 102 and the ATSC-M/H transmitter 106 (step 204). The pseudorange represents the time difference (or equivalent distance) between a time of transmission from a transmitter 108 of a component of the ATSC-M/H broadcast signal and a time of reception at the user terminal 102 of the component, as well as a clock offset at the user terminal 102.

User terminal 102 transmits the pseudorange to location server 110. In one implementation, location server 110 is implemented as a general-purpose computer executing software designed to perform the operations described herein. In another implementation, location server is implemented as an ASIC (application-specific integrated circuit). In one implementation, location server 110 is implemented within or near base station 104.

Location server 110 receives information describing the phase center (i.e., the location) of each ATSC-M/H transmitter 106 from a database 112. In one implementation, the phase center of each ATSC-M/H transmitter 106 is measured by surveying the antenna phase center.

In one implementation, location server 110 receives weather information describing the air temperature, atmospheric pressure, and humidity in the vicinity of user terminal 102 from a weather server 114. The weather information is available from the Internet and other sources such as NOAA. Location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

Location server 110 can also receive from base station 104 information which identifies a general geographic location of user terminal 102. For example, the information can identify a cell or cell sector within which a cellular telephone is located. This information is used for ambiguity resolution, as described below.

Figure 3:
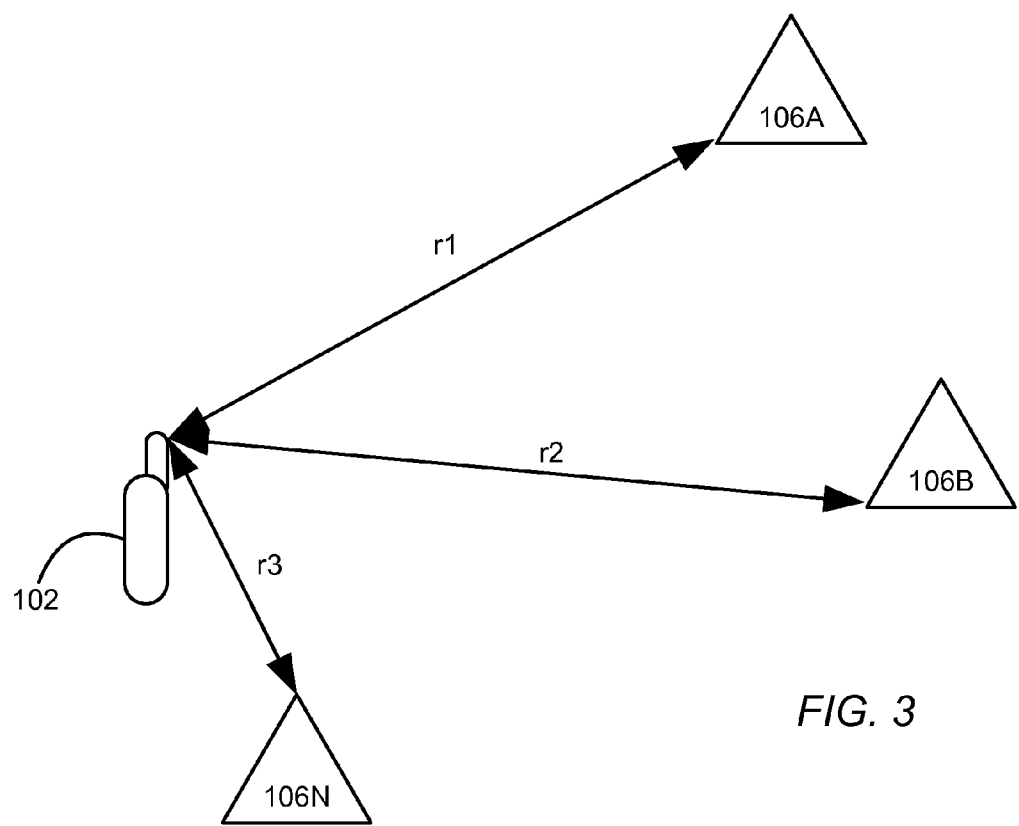
FIG. 3 depicts the geometry of a position determination using 3 DTV transmitters.

Location server 110 determines a position of the user terminal based on the pseudorange and a location of the transmitter (step 206). FIG. 3 depicts the geometry of a position determination using three ATSC-M/H transmitters 106. ATSC-M/H transmitter 106A is located at position (x1, y1). The range between user terminal 102 and ATSC-M/H transmitter 106A is r1. ATSC-M/H 106B transmitter is located at position (x2, y2). The range between user terminal 102 and ATSC-M/H transmitter 106B is r2. ATSC-M/H transmitter 106N is located at position (x3, y3). The range between user terminal 102 and ATSC-M/H transmitter 106N is r3.

Location server 110 may adjust the value of each pseudorange according to the tropospheric propagation velocity and the time offset for the corresponding ATSC-M/H transmitter 106. Location server 110 uses the phase center information from database 112 to determine the position of each ATSC-M/H transmitter 106.

User terminal 102 makes three or more pseudorange measurements to solve for three unknowns, namely the position (x, y) and clock offset T of user terminal 102. In other implementations, the techniques disclosed herein are used to determine position in three dimensions such as longitude, latitude, and altitude, and can include factors such as the altitude of the ATSC-M/H transmitters.

The three pseudorange measurements pr1, pr2 and pr3 are given by $$pr1 = r1 + T \quad (2a)$$

$$pr2 = r2 + T \quad (3a)$$

$$pr3 = r3 + T \quad (4a)$$

The three ranges can be expressed as $$r1 = |X - X1| \quad (5)$$

$$r2 = |X - X2| \quad (6)$$

$$r3 = |X - X3| \quad (7)$$

where X represents the two-dimensional vector position (x, y) of user terminal, X1 represents the two-dimensional vector position (x1, y1) of ATSC-M/H transmitter 106A, X2 represents the two-dimensional vector position (x2, y2) of ATSC-M/H transmitter 106B, and X3 represents the two-dimensional vector position (x3, y3) of ATSC-M/H transmitter 106N. These relationships produce three equations in which to solve for the three unknowns x, y, and T. Location server 110 solves these equations according to conventional well-known methods. In an E911 application, the position of user terminal 102 is transmitted to E911 location server 116 for distribution to the proper authorities. In another application, the position is transmitted to user terminal 102.

Now, techniques for projecting the measurements at the user terminal 102 to a common instant in time are described. Note that this is not necessary if the clock of the user terminal 102 is stabilized or corrected using a signal from the cellular base station or a ATSC-M/H transmitter 106. When the user clock is not stabilized, or corrected, the user clock offset can be considered to be a function of time, T(t). For a small time interval, $\Delta$, the clock offset, T(t), can be modeled by a constant and a first order term. Namely, $$T(t + \Delta) = T(t) + \frac{\partial T}{\partial t} \Delta \quad (8)$$

We now reconsider equations (2a)-(4a) treating the clock offset as a function of time. Consequently, the pseudorange measurements are also a function of time. For clarity, we assume that the ranges remain essentially constant over the interval $\Delta$. The pseudorange measurements may be described as:

$$pr1(t1) = r1 + T(t1) \quad (2b)$$

$$pr2(t2) = r2 + T(t2) \quad (3b)$$

$$prN(tN) = rN + T(tN) \quad (4b)$$

In one embodiment, the user terminal 102 commences with an additional set of pseudorange measurements at some time $\Delta$ after the initial set of measurements. These measurements may be described:

$$pr1(t1 + \Delta) = r1 + T(t1) + \frac{\partial T}{\partial t} \Delta \quad (2c)$$

$$pr2(t2 + \Delta) = r2 + T(t2) + \frac{\partial T}{\partial t} \Delta \quad (3c)$$

$$prN(tN + \Delta) = rN + T(tN) + \frac{\partial T}{\partial t} \Delta \quad (4c)$$

The user terminal 102 then projects all the pseudorange measurements to some common point in time so that the effect of the first order term is effectively eliminated. For example, consider if some common reference time t0 is used. Applying equations (2b-4b) and (2c-4c) it is straightforward to show that we can project the measurements to a common instant of time as follows:

$$pr1(t0)=pr1(t1)+[pr1(t1+\Delta)-pr1(t1)](t0-t1)/\Delta \qquad (2d)$$

$$pr2(t0)=pr2(t2)+[pr2(t2+\Delta)-pr2(t2)](t0-t2)/\Delta \qquad (3d)$$

$$prN(t0)=prN(tN)+[prN(tN+\Delta)-prN(tN)](t0-tN)/\Delta \qquad (4d)$$

These projected pseudorange measurements are communicated to the location server where they are used to solve the three unknowns x, y, and T. Note that the projection in equations (2d-4d) is not precise, and second order terms are not accounted for. However the resulting errors are not significant. One skilled in the art will recognize that second order and higher terms may be accounted for by making more than two pseudorange measurements for each projection. Notice also that there are many other approaches to implementing this concept of projecting the pseudorange measurements to the same instant of time. One approach, for example, is to implement a delay lock loop such as those disclosed in J. J. Spilker, Jr., Digital Communications by Satellite, Prentice-Hall, Englewood Cliffs, N.J., 1977, 1995 and B. W. Parkinson and J. J. Spilker, Jr., Global Positioning System-Theory and Application, Volume 1, AIAA, Washington, D.C. 1996, both incorporated by reference herein. A separate tracking loop can be dedicated to each ATSC-M/H transmitter 106. These tracking loops effectively interpolate between pseudorange measurements. The state of each of these tracking loops is sampled at the same instant of time.

According to the ATSC-M/H standard, the transmission times for individual transmitters in a single-frequency network configuration may have fixed offsets from ATSC time. In such configurations, these offsets are used in position determination. For example, the offsets could be stored on location server 110 or database 112, and passed to user terminal 102 as needed. As another example, monitor stations could provide the offsets.

In another implementation, user terminal 102 does not compute pseudoranges, but rather takes measurements of the ATSC-M/H signals that are sufficient to compute pseudorange, and transmits these measurements to location server 110. Location server 110 then computes the pseudoranges based on the measurements, and computes the position based on the pseudoranges, as described above.

Position Location Performed by User Terminal

In another implementation, the position of user terminal 102 is computed by user terminal 102. In this implementation, all of the necessary information is transmitted to user terminal 102. This information can be transmitted to user terminal by location server 110, base station 104, one or more ATSC-M/H transmitters 106, or any combination thereof. User terminal 102 then measures the pseudoranges and solves the simultaneous equations as described above. This implementation is now described.

User terminal 102 receives the time offset between the local clock of each ATSC-M/H transmitter and a reference clock. User terminal 102 also receives information describing the phase center of each ATSC-M/H transmitter 106 from a database 112.

User terminal 102 receives the tropospheric propagation velocity computed by location server 110. In another implementation, user terminal 102 receives weather information describing the air temperature, atmospheric pressure, and humidity in the vicinity of user terminal 102 from a weather server 114. and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution, as described below.

User terminal 102 receives ATSC-M/H signals from a plurality of ATSC-M/H transmitters 106 and determines a pseudorange between the user terminal 102 and each ATSC-M/H transmitter 106. User terminal 102 then determines its position based on the pseudoranges and the phase centers of the transmitters.

In any of these of the implementations, should only two ATSC-M/H transmitters be available, the position of user terminal 102 can be determined using the two ATSC-M/H transmitters and the offset T computed during a previous position determination. The values of T can be stored or maintained according to conventional methods.

In one implementation, base station 104 determines the clock offset of user terminal 102. In this implementation, only two ATSC-M/H transmitters are required for position determination. Base station 104 transmits the clock offset T to location server 110, which then determines the position of user terminal 102 from the pseudorange computed for each of the ATSC-M/H transmitters.

In another implementation, when only one or two ATSC-M/H transmitters are available for position determination, GPS is used to augment the position determination. Techniques for positioning using TV and GPS signals are also disclosed in U.S. Pat. No. 7,463,195, the disclosure thereof incorporated by reference herein in its entirety.

Receiver Architecture

Figure 4:
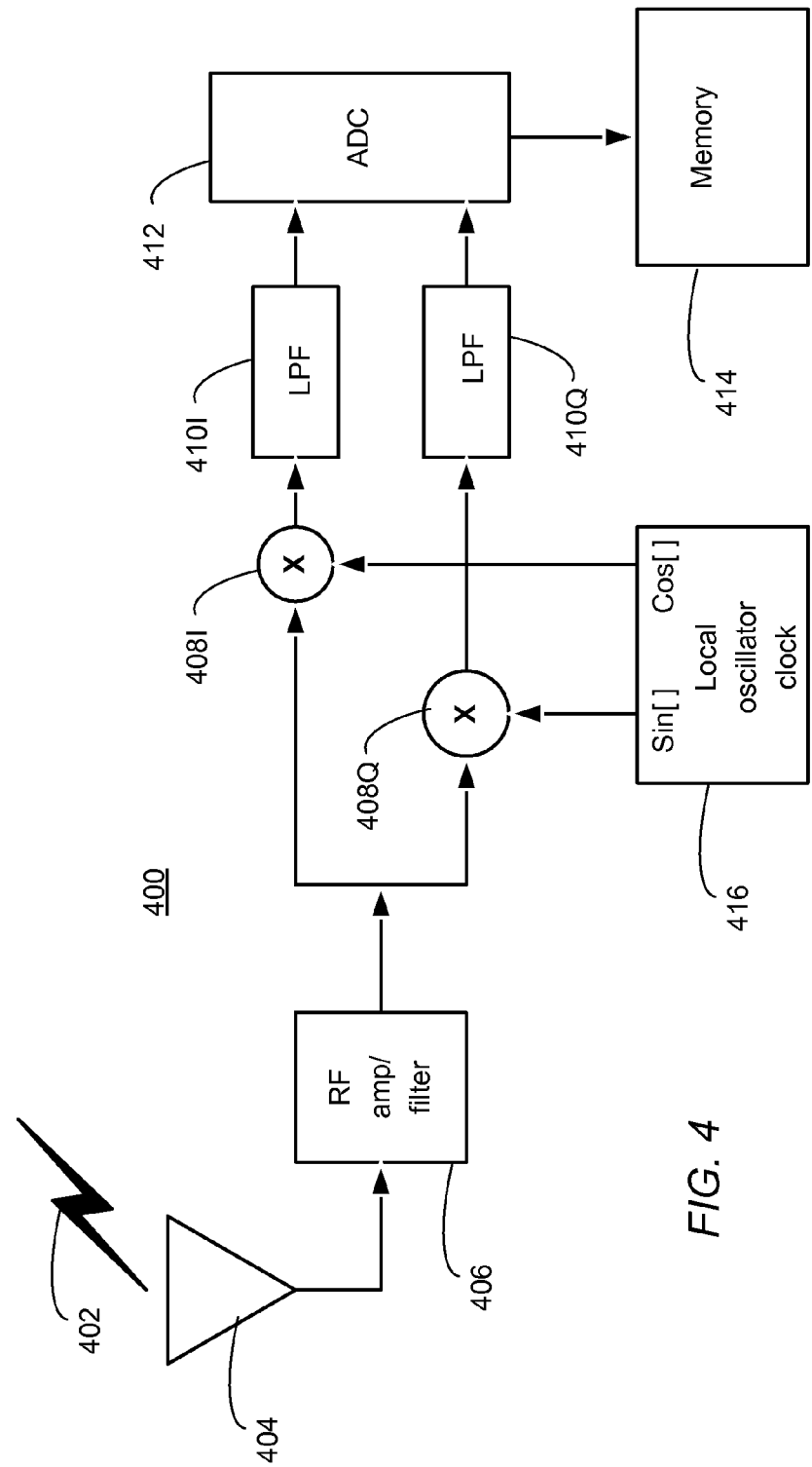
FIG. 4 depicts an implementation of a sampler for use in taking samples of received DTV signals.

FIG. 4 depicts an implementation 400 of a sampler for use in taking samples of received ATSC-M/H signals. In one implementation, sampler 400 is implemented within user terminal 102. The sampling rate should be sufficiently high to obtain an accurate representation of the ATSC-M/H signal, as would be apparent to one skilled in the art.

Sampler 400 receives a ATSC-M/H signal 402 at an antenna 404. A radio frequency (RF) amp/filter 406 amplifies and filters the received ATSC-M/H signal. A local oscillator clock 416 and mixers 408I and 408Q downconvert the signal to produce in-phase (I) and quadrature (Q) samples, respectively. The I and Q samples are respectively filtered by low-pass filters (LPF) 410I and 410Q. An analog-to-digital converter (ADC) 412 converts the I and Q samples to digital form. The digital I and Q samples are stored in a memory 414.

Figure 5:
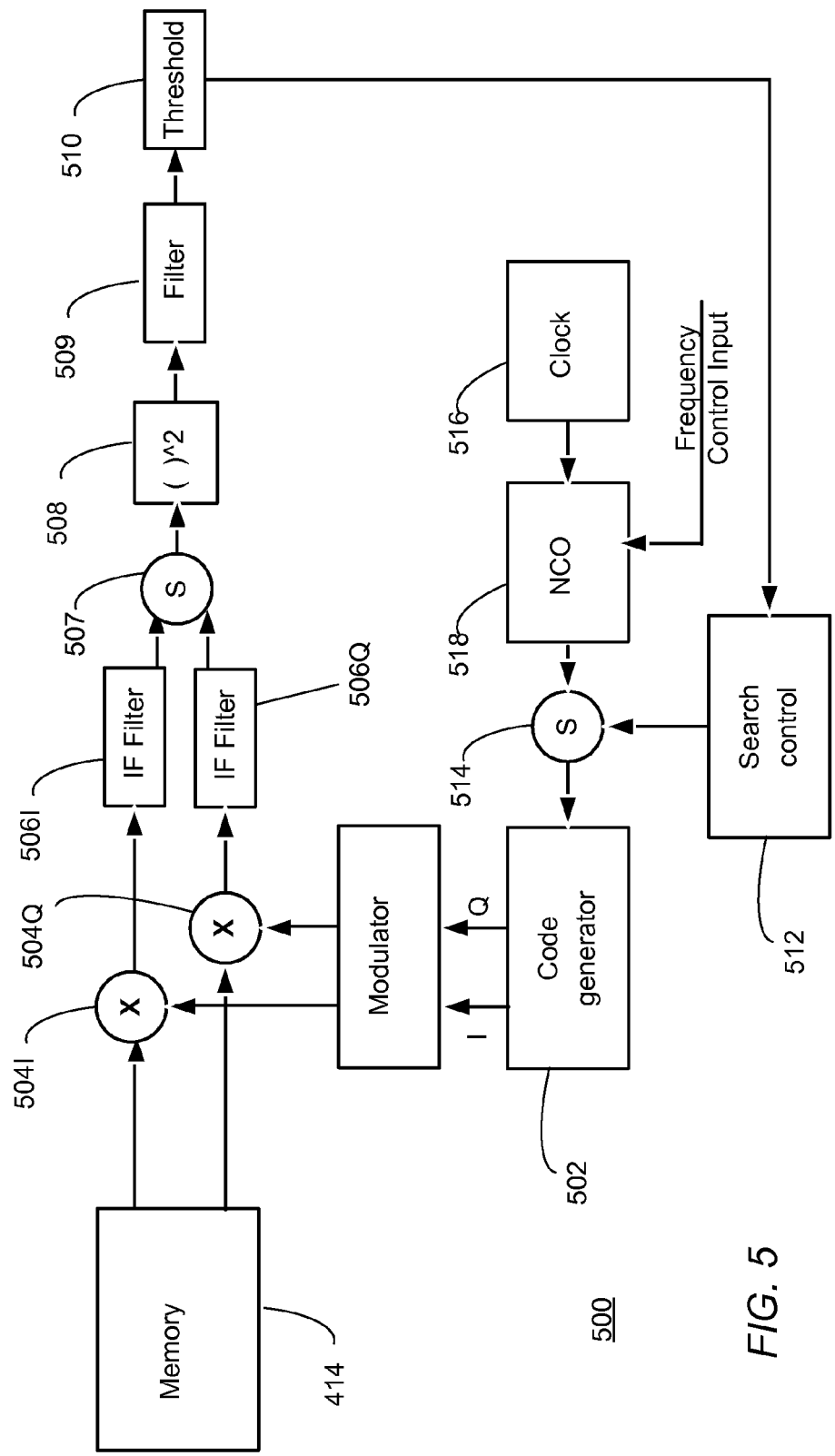
FIG. 5 depicts an implementation of a noncoherent correlator for use in searching for the correlation peak of the DTV signal samples produced by the sampler of FIG. 4.

FIG. 5 depicts an implementation 500 of a noncoherent correlator for use in searching for the correlation peak of the ATSC-M/H signal samples produced by sampler 400. In one implementation, correlator 500 is implemented within user terminal 102.

Correlator 500 retrieves the I and Q samples of a ATSC-M/H signal from memory 414. Correlator 500 processes the samples at intermediate frequency (IF). Other implementations process the samples in analog or digital form, and can operate at intermediate frequency (IF) or at baseband.

A code generator 502 generates a code sequence. In one implementation, the code sequence is a raised cosine waveform. The code sequence can be any known digital sequence in the ATSC-M/H signal. In some implementations, the code sequence includes one or more of the ATSC-M/H training sequences. In some implementations, the code includes other ATSC codes such as synchronization codes. In one implementation, the synchronization code is a Field Synchronization Segment within an ATSC data frame. In another implementation, the synchronization code is a Synchronization Segment within a Data Segment within an ATSC data frame. In still another implementation, the synchronization code includes both the Field Synchronization Segment within an ATSC data frame and the Synchronization Segments within the Data Segments within an ATSC data frame.

Mixers 504I and 504Q respectively combine the I and Q samples with the code generated by code generator 502. The outputs of mixers 504I and 504Q are respectively filtered by filters 506I and 506Q and provided to summer 507. The sum is provided to square law device 508. Filter 509 performs an envelope detection for non-coherent correlation, according to conventional methods. Comparator 510 compares the correlation output to a predetermined threshold. If the correlation output falls below the threshold, search control 512 causes summer 514 to add additional pulses to the clocking waveform produced by clock 516, thereby advancing the code generator by one symbol time, and the process repeats. In a preferred embodiment, the clocking waveform has a nominal clock rate of 10.76 MHz, matching the clock rate or symbol rate of the received ATSC-M/H signals.

When the correlation output first exceeds the threshold, the process is done. The time offset that produced the correlation output is used as the pseudorange for that ATSC-M/H transmitter 106.

In receiver correlators and matched filters there are two important sources of receiver degradation. The user terminal local oscillator is often of relatively poor stability in frequency. This instability affects two different receiver parameters. First, it causes a frequency offset in the receiver signal. Second, it causes the received bit pattern to slip relative to the symbol rate of the reference clock. Both of these effects can limit the integration time of the receiver and hence the processing gain of the receiver. The integration time can be increased by correcting the receiver reference clock. In one implementation a delay lock loop automatically corrects for the receiver clock.

In another implementation a NCO (numerically controlled oscillator) 518 adjusts the clock frequency of the receiver to match that of the incoming received signal clock frequency and compensate for drifts and frequency offsets of the local oscillator in user terminal 102. Increased accuracy of the clock frequency permits longer integration times and better performance of the receiver correlator. The frequency control input of NCO 518 can be derived from several possible sources, a receiver symbol clock rate synchronizer, tracking of the ATSC pilot carrier, or other clock rate discriminator techniques installed in NCO 518.

Position Location Enhancements

Figure 6:
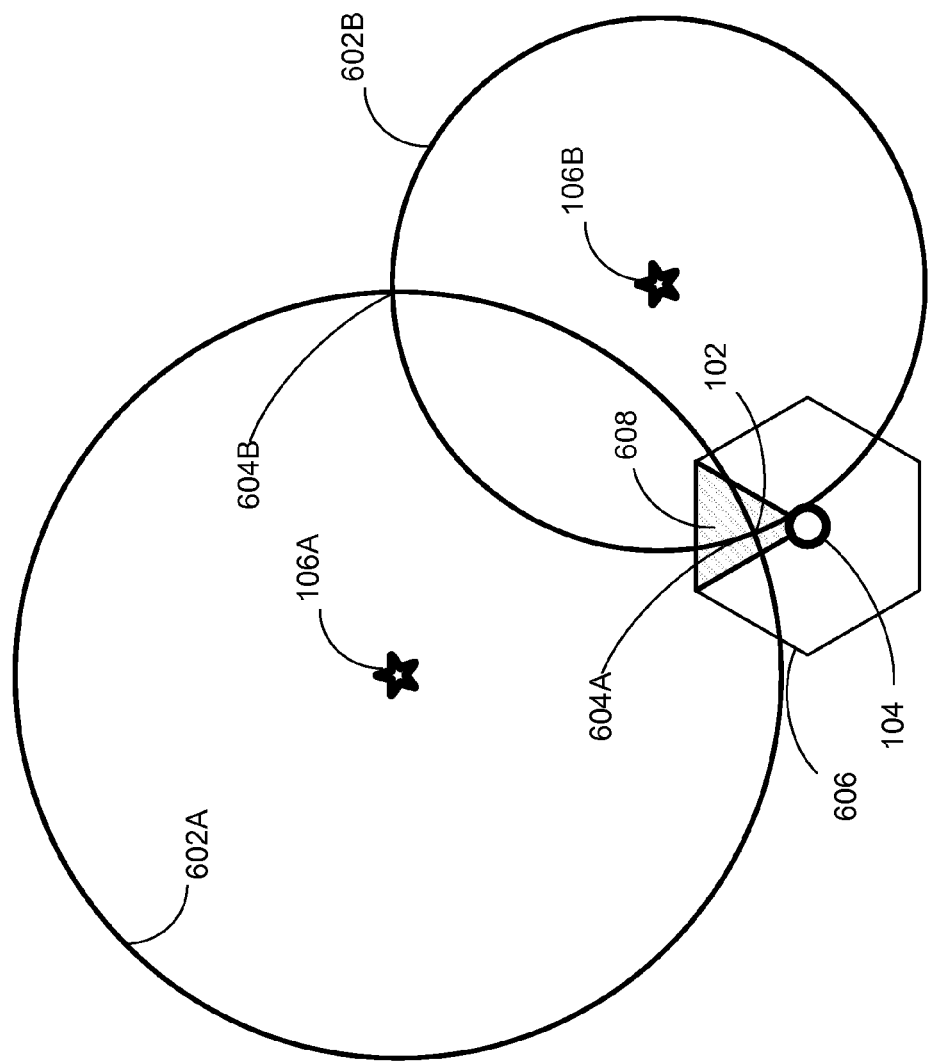
FIG. 6 illustrates a simple example of a position location calculation for a user terminal receiving DTV signals from two separate DTV antennas.

FIG. 6 illustrates a simple example of a position location calculation for a user terminal 102 receiving ATSC-M/H signals from two separate ATSC-M/H antennas 106A and 106B. Circles of constant range 602A and 602B are drawn about each of transmit antennas 106A and 106B, respectively. The position for a user terminal, including correction for the user terminal clock offset, is then at one of the intersections 604A and 604B of the two circles 602A and 602B. The ambiguity is resolved by noting that base station 104 can determine in which sector 608 of its footprint (that is, its coverage area) 606 the user terminal is located. Of course if there are more than two ATSC-M/H transmitters in view, the ambiguity can be resolved by taking the intersection of three circles.

In one implementation, user terminal 102 can accept an input from the user that gives a general indication of the area, such as the name of the nearest city. In one implementation, user terminal 102 scans available ATSC-M/H channels to assemble a fingerprint of the location. User terminal 102 compares this fingerprint to a stored table that matches known fingerprints with known locations to identify the current location of user terminal 102.

Figure 7:
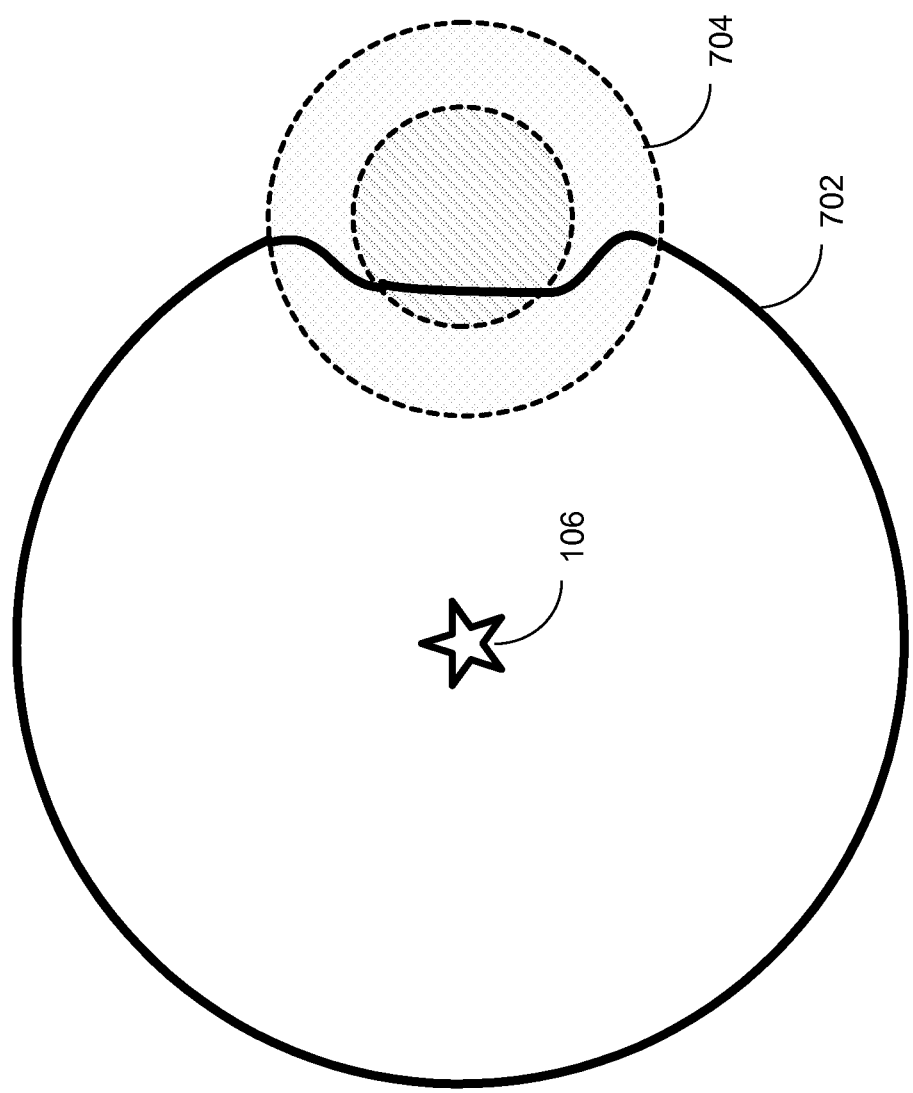
FIG. 7 depicts the effects of a single hill on a circle of constant range for a DTV transmitter that is located at the same altitude as the surrounding land.

In one implementation the position location calculation includes the effects of ground elevation. Thus in terrain with hills and valleys relative to the phase center of the ATSC-M/H antenna 106 the circles of constant range are distorted. FIG. 7 depicts the effects of a single hill 704 on a circle of constant range 702 for a ATSC-M/H transmitter 106 that is located at the same altitude as the surrounding land.

The computations of user position are easily made by a simple computer having as its database a terrain topographic map which allows the computations to include the effect of user altitude on the surface of the earth, the geoid. This calculation has the effect of distorting the circles of constant range as shown in FIG. 7.

ATSC-M/H Signal Description

The ATSC-M/H signal is briefly described below. Further details are available in the document "ATSC Mobile DTV Standard, Part 2—RF/Transmission System Characteristics," by the Advanced Television Systems Committee, also referred to herein as the A/153 standard. The ATSC-M/H signal uses 8-ary Vestigial Sideband Modulation (8VSB). The symbol rate of the ATSC-M/H signal is 10.762237 MHz, which is derived from a 27.000000 MHz clock.

Figure 8:
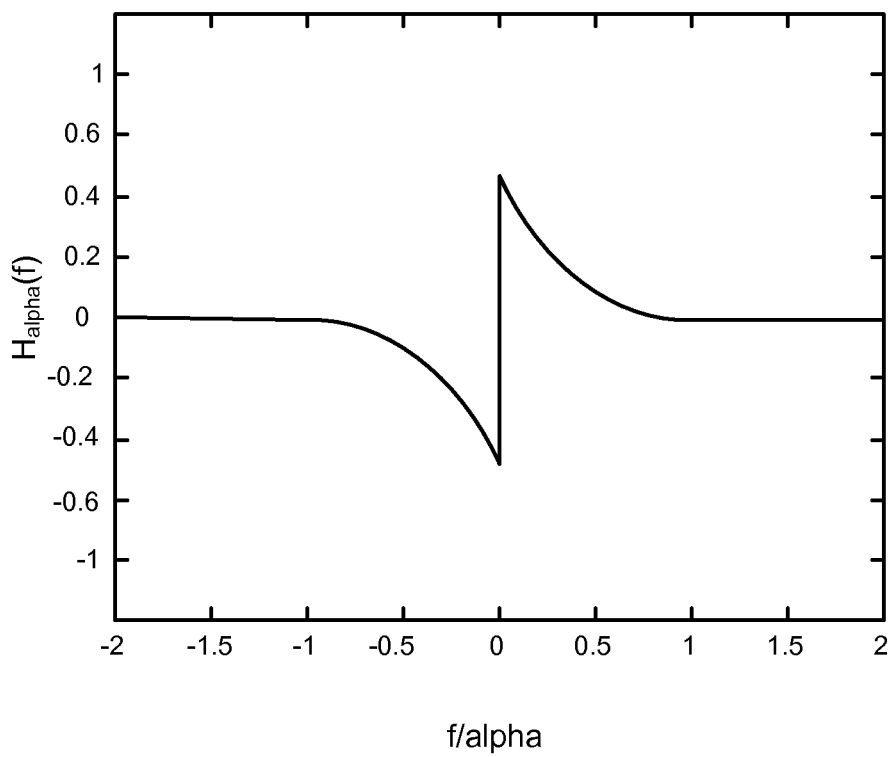
FIG. 8 shows a plot of the gain function for a filter used in producing an ATSC DTV signal.

The 8VSB signal is constructed by filtering. The in-phase segment of the symbol pulse has a raised-cosine characteristic, as described in J. G. Proakis, Digital Communications, McGraw-Hill, $3^{rd}$ edition, 1995. The pulse can be described as $$p(t) = \mathrm{sinc}\left(\frac{\pi t}{T}\right)\frac{\cos\left(\frac{\pi\beta t}{T}\right)}{1 - \frac{4\beta^2 t^2}{T^2}} \quad (9)$$

where T is the symbol period $$T = \frac{1}{10.76 \times 10^6} \quad (10)$$

and $\beta=0.5762$. This signal has a frequency characteristic $$P(f) = \begin{cases} T & \left(0 \le |f| \le \frac{1-\beta}{2T}\right) \\ \frac{T}{2}\left\{1 + \cos\left[\frac{\pi T}{\beta}\left(|f| - \frac{1-\beta}{2T}\right)\right]\right\}\left(\frac{1-\beta}{2T} \le |f| \le \frac{1+\beta}{2T}\right) \\ 0 & \left(|f| > \frac{1+\beta}{2T}\right) \end{cases} \quad (11)$$

from which it is clear that the one-sided bandwidth of the signal is $(1+\beta)10.762237$ MHz=5.38 MHz+0.31 MHz. In order to create a VSB signal from this in-phase pulse, the signal is filtered so that only a small portion of the lower sideband remains. This filtering can be described as:

$$P_v(f) = P(f)(U(f) - H_\alpha(f)) \quad (12)$$

where $$U(f) = \begin{cases} 1, f \ge 0 \\ 0, f < 0 \end{cases} \quad (13)$$

where $H_\alpha(f)$ is a filter designed to leave a vestigial remainder of the lower sideband. A plot of the gain function for $H_\alpha(f)$ is shown in FIG. 8. The filter satisfies the characteristics $H_\alpha(-f)=-H_\alpha(f)$ and $H_\alpha(f)=0$, $f>\alpha$.

The response $U(f)P(f)$ can be represented as $$U(f)P(f) = \frac{1}{2}\left(P(f) + j\breve{P}(f)\right) \quad (14)$$

where $\breve{P}(f) = -j\,\text{sgn}(f)P(f)$ is the Hilbert transform of $P(f)$. The VSB pulse may be represented as $$P_v(f) = \frac{1}{2}X(f) + \frac{j}{2}\left(\breve{X}(f) + 2X(f)H_\alpha(f)\right) \quad (15)$$

and the baseband pulse signal $$p_v(t) = \frac{1}{2}x(t) + \frac{j}{2}\left(\breve{x}(t) + x_\alpha(t)\right) = p_{vi}(t) + jp_{vq}(t) \quad (16)$$

where $p_{vi}(t)$ is the in-phase component, $p_{vq}(t)$ is the quadrature component, and $$x_\alpha(t) = 2\int_{-\alpha}^{\alpha} X(f)H_\alpha(f)e^{j2\pi ft}df \quad (17)$$

Before the data is transmitted, the ATSC-M/H signal also embeds a carrier signal, which has −11.3 dB less power than the data signal. This carrier aids in coherent demodulation of the signal. Consequently, the transmitted signal can be represented as:

$$s(t) = \sum_n C_n\{p_{vi}(t-nT)\cos(\omega t) - p_{vq}(t-nT)\sin(\omega t)\} + A\cos(\omega t) \quad (18)$$

where $C_n$, is the 8-level data signal.

Figure 9:
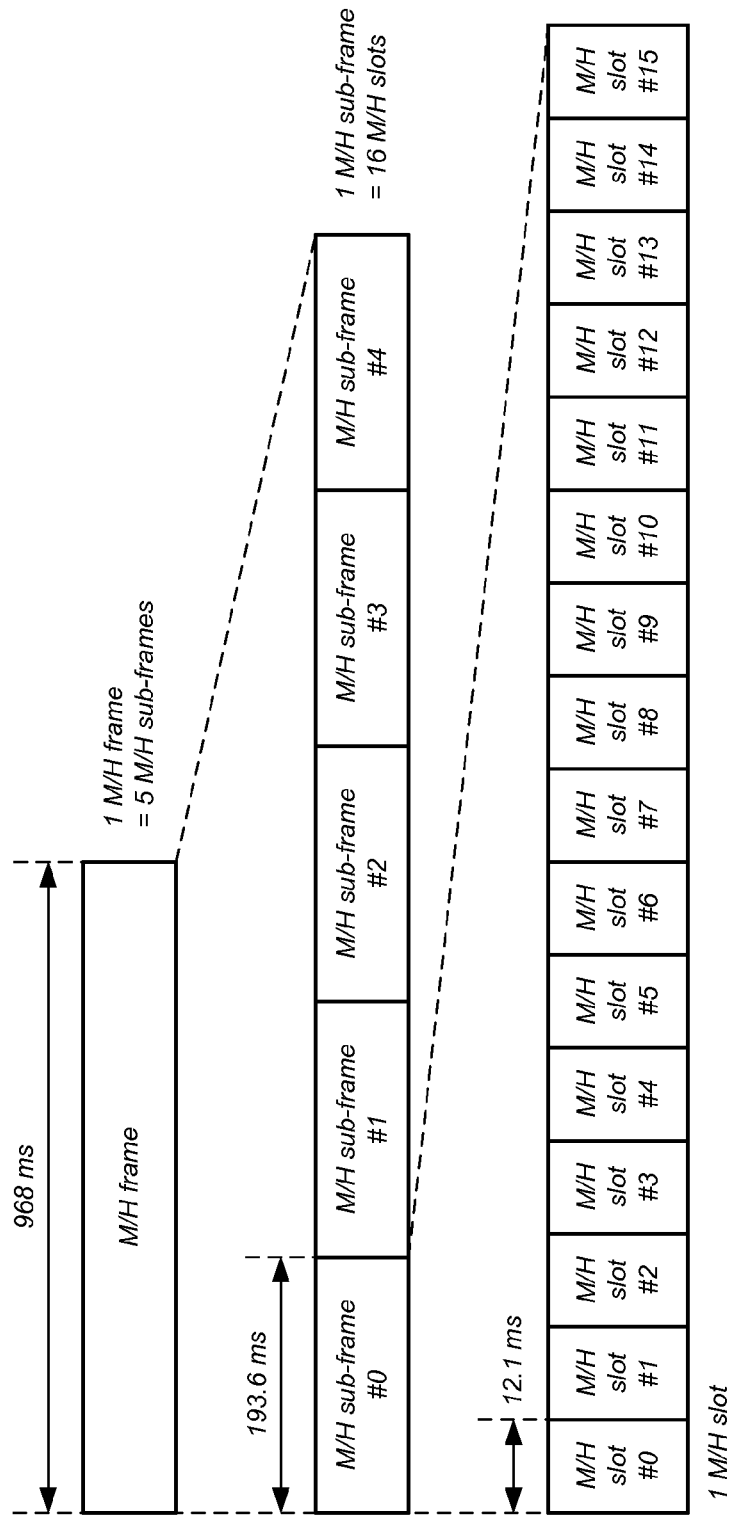
FIG. 9 shows the structure of the ATSC-M/H frame.

Data is transmitted with the ATSC-M/H signal using a data structure termed the ATSC-M/H frame. FIG. 9 shows the structure of the ATSC-M/H frame. The ATSC-M/H frame has a duration of 968 ms, and consists of 5 M/H sub-frames, each having a duration of 193.6 ms. Each sub-frame consists of 16 M/H slots. Each slot consists of 156 transport stream (TS) packets, or equivalently one half of a VSB data field of a VSB data frame. A M/H group is defined as the last 118 of the 156 TS packets in a slot.

Figure 10:
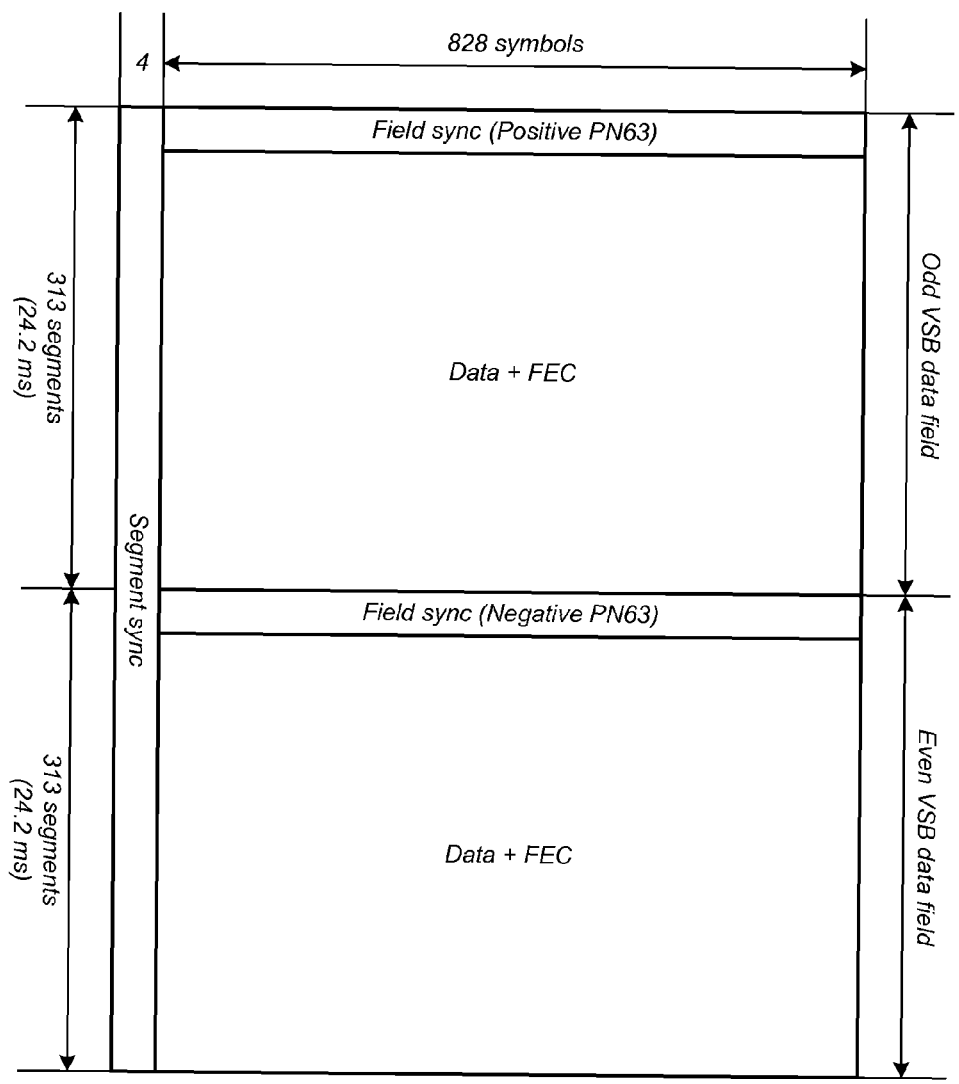
FIG. 10 shows the structure of the VSB data frame.
Figure 11:
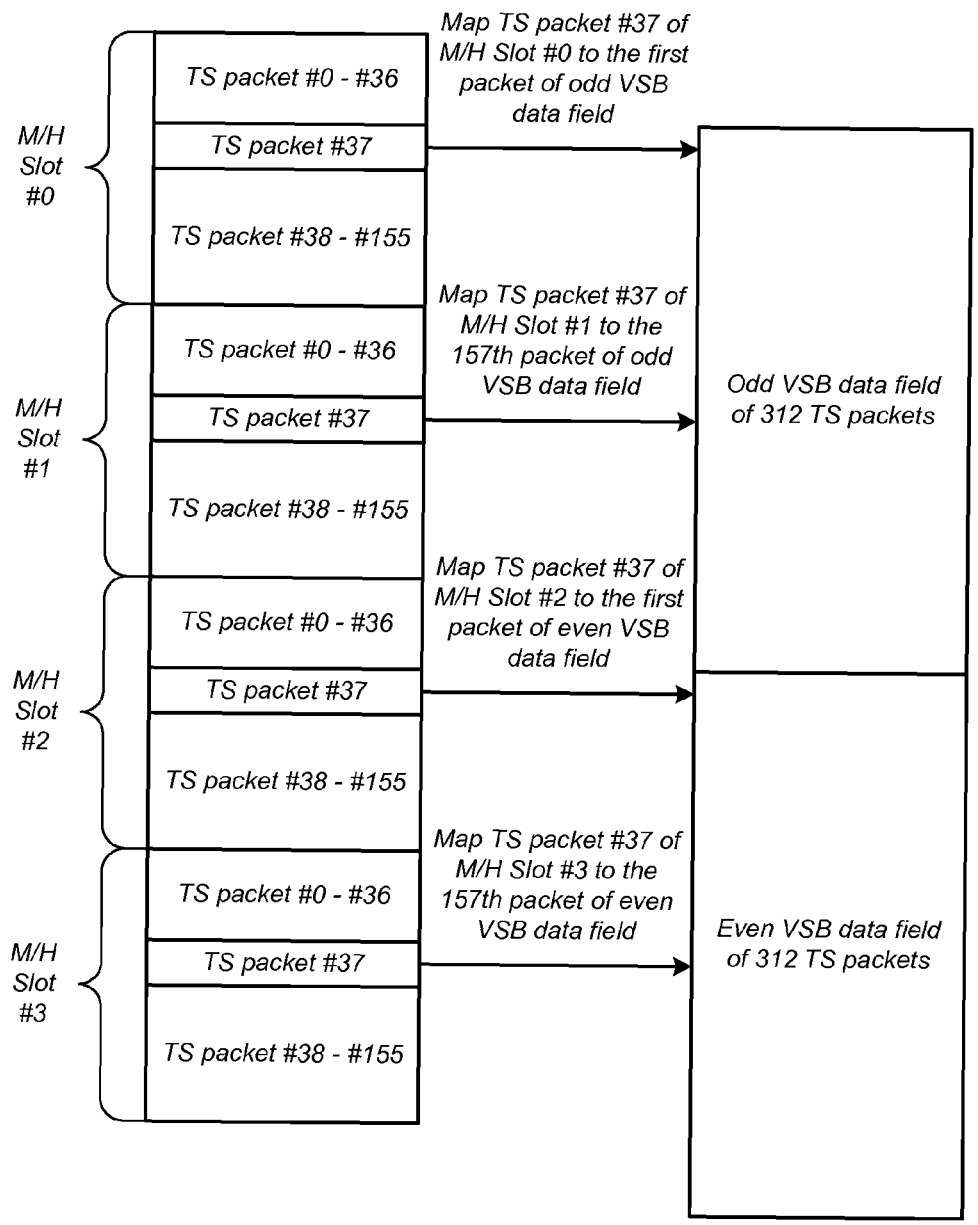
FIG. 11 shows the relationship between the ATSC-M/H frame and the VSB data frame.

The structure of the VSB data frame is illustrated in FIG. 10. The VSB data frame consists of a total of 626 segments, each with 832 symbols, for a total of 520832 symbols. The VSB data frame includes two data fields, termed odd and even. The first segment of each data field begins with a field synchronization segment, which is followed by 312 data segments. Each segment begins with 4 symbols that are used for synchronization purposes. The relationship between the ATSC-M/H frame and the VSB data frame is shown in FIG. 11.

Figure 12:
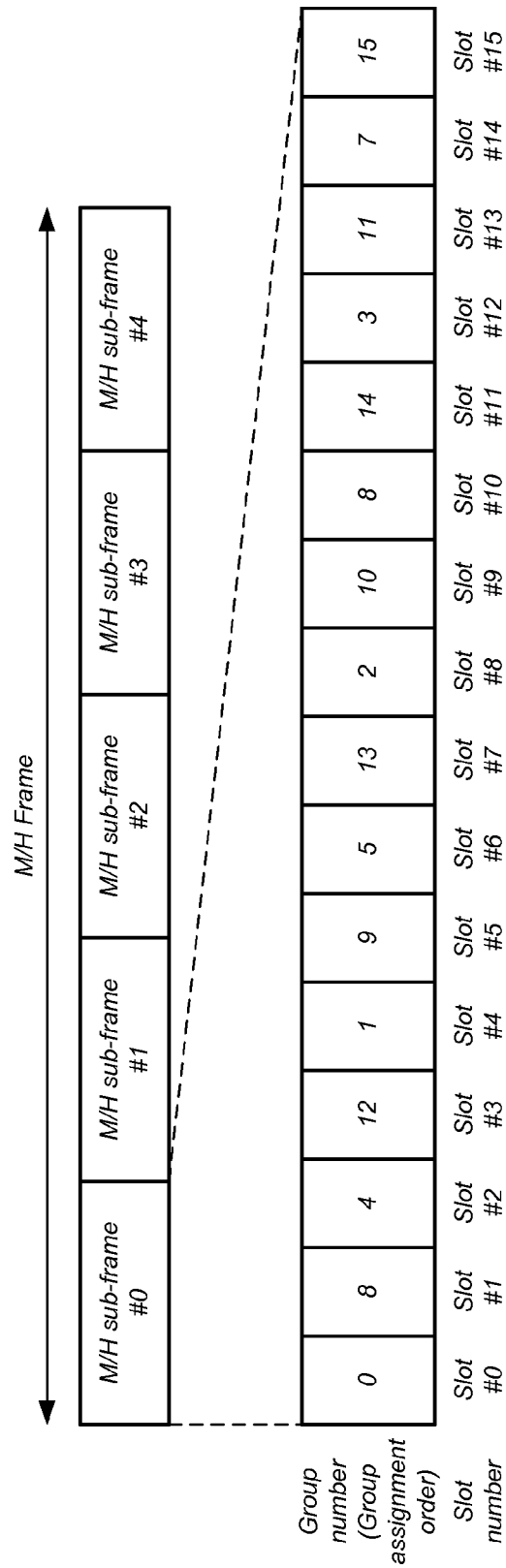
FIG. 12 shows the relationship between group and slot numbers.

A number of M/H groups that transmit related data (such as a TV program) may be combined into an M/H parade. Each parade may be associated with 1-8 M/H groups. Each group is assigned to a given slot number according to FIG. 12.

An ATSC byte interleaver spreads an M/H group over 170 data segments, with the number of bytes remaining unchanged. The first 5 segments, and the last 5 segments, of the interleaved M/H group contain only RS parity data. The remaining 160 segments are divided into 10 M/H blocks of 16 data segments each (B1-B10). M/H Blocks B3, B4, B5, B6 and B7 contain known training data sequences.

Trellis encoding expands the 207 bytes of a data segment to the 828 data symbols of an 8-VSB segment. After Trellis encoding, the last two 8-VSB segments of blocks B3, B4, B5, B6 and B7 contain the same set of 1416 known training symbols split between 588 tail-end symbols of the penultimate segments and 828 symbols in the ultimate segments. Segments 2 and 3 of block B4 contain two repetitions of a known 528-symbol sequence towards the end and the beginning of their respective segments. The training sequences are listed in Annex A of the A/153 standard.

Slot assignment for an M/H group or parade remain the same over all 5 M/H sub-frames in an M/H frame, but may change from one M/H frame to the next. However, as long as any M/H groups are to be transmitted, one will appear in slot #0. In even-numbered slots (that is, slots 0, 2, 4, 6, 8, 10, 12 and 14) the ATSC 8-VSB field synchronization segment appears between the last segment of block B2 and the first segment of block B3. The ATSC field sync includes a known PN511 sequence and a triplet of a known PN63 sequence where the middle sequence changes sign every 313 segments.

Figure 13:
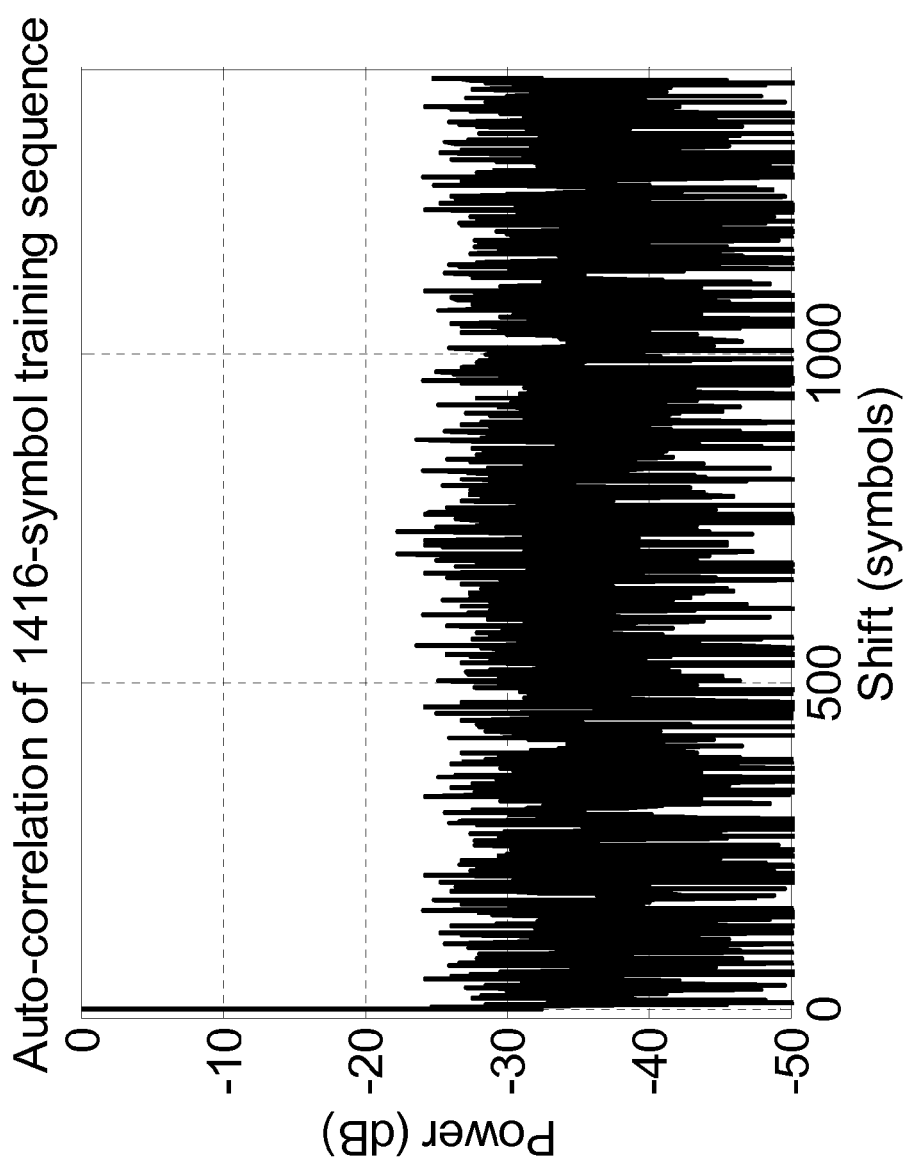
FIG. 13 shows an auto-correlation of the M/H 1416-symbol training sequence.
Figure 14:
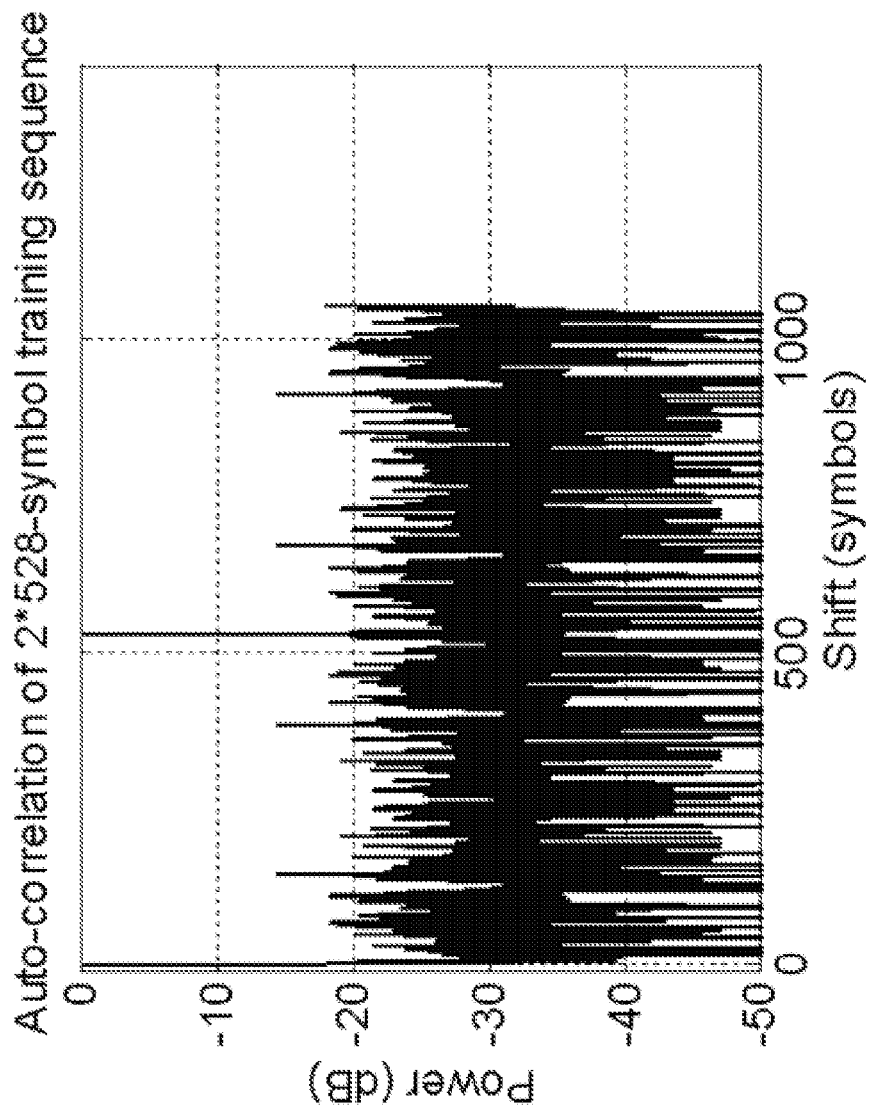
FIG. 14 shows an auto-correlation of the M/H 2*528-symbol training sequence.

These known training sequences lend themselves well to measuring pseudoranges because they have good auto-correlation properties. FIG. 13 shows an auto-correlation of the 1416-symbol training sequence. FIG. 14 shows an auto-correlation of the 2*528-symbol training sequence.

In total, an M/H group has nearly 16 times the number of known symbols compared to the PN511 of the ATSC field sync segment, but each M/H group only appears every 8 field syncs. If all 16 slots of an M/H sub-frame were filled with M/H groups, their training sequences would represent a factor of ~32 times the number of known symbols compared to an equivalent conventional ATSC signal. Such a boon of additional signal energy can be used to improve a receiver's sensitivity, or to speed up the measurement integration process for equivalent sensitivity levels. For measuring pseudoranges, a receiver can use just the M/H training signals, just the conventional ATSC PN511 and PN63 signals, or a combination of M/H signals and conventional ATSC signals.

Either set of pseudorange measurements from a given ATSC M/H transmitter can be combined with other types of pseudorange measurements, such as ATSC, NTSC, PAL, SECAM, T-DMB, DVB-H, GPS etc, from other transmitter locations to provide position, velocity, frequency and time determination. In cases where any such transmitters are not locked to a common time and frequency source, a monitor system could be used to correct transmitter time-of-transmissions before measurements were applied in position, velocity, frequency and time determination, as described below. Monitor units can also be used for frame-matching, which is useful for position, time, and frequency determination. In frame matching, the location of user terminal 102 is identified through the use of the contents of the signals received by user terminal 102. That is, the data conveyed by the signals is used to identify the location of user terminal 102. Frame matching is further described in U.S. patent application Ser. No. 12/209,971, the disclosure thereof incorporated by reference herein in its entirety.

Software Receivers

One thorough approach to mitigating the effects of multipath is to sample an entire autocorrelation function, rather than to use only early and late samples as in a hardware setup. Multipath effects can be mitigated by selecting the earliest correlation peak.

In the case that position can be computed with a brief delay, such as in E911 applications, a simple approach is to use a software receiver, which samples a sequence of the filtered signal, and then processes the sample in firmware on a DSP.

Figure 15:
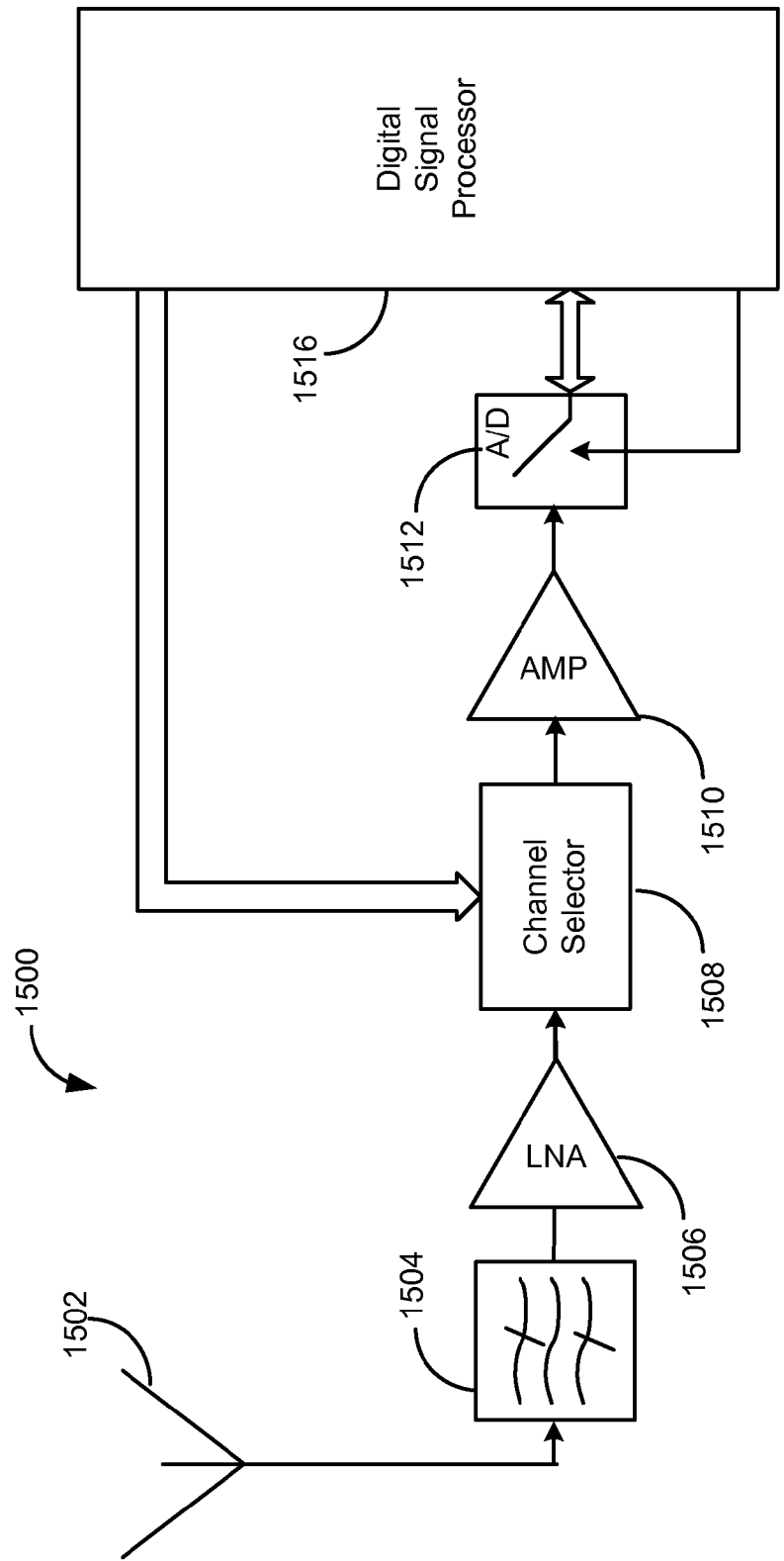
FIG. 15 illustrates one implementation for tracking in software.

FIG. 15 illustrates one implementation 1500 for tracking in software. An antenna 1502 receives a ATSC-M/H signal. Antenna 1502 can be a magnetic dipole or any other type of antenna capable of receiving ATSC-M/H signals. A bandpass filter 1504 passes the entire ATSC-M/H signal spectrum to an LNA 1506. In one implementation, filter 1504 is a tunable bandpass filter that passes the spectrum for a particular ATSC-M/H channel under the control of a digital signal processor (DSP) 1514.

A low-noise amplifier (LNA) 1506 amplifies and passes the selected signal to a ATSC-M/H channel selector 1508. ATSC-M/H channel selector 1508 selects a particular ATSC-M/H channel under the control of DSP 1514, and filters and downconverts the selected channel signal from UHF (ultra-high frequency) to IF (intermediate frequency) according to conventional methods. An amplifier (AMP) 1510 amplifies the selected IF channel signal. An analog-to-digital converter and sampler (A/D) 1512 produces digital samples of the ATSC-M/H channel signal s(t) and passes these samples to DSP 1514.

Now the processing of the ATSC-M/H channel signal by DSP 1514 is described for a coherent software receiver. A nominal offset frequency for the downconverted sampled signal is assumed. If this signal is downconverted to baseband, the nominal offset is 0 Hz. The process generates the complete autocorrelation function based on samples of a signal s(t). The process may be implemented far more efficiently for a low duty factor signal. Let $T_i$ be the period of data sampled, $\omega_{in}$ be the nominal offset of the sampled incident signal, and let $\omega_{offset}$ be the largest possible offset frequency, due to Doppler shift and oscillator frequency drift. The process implements the pseudocode listed below.

$R_{max}=0$
Create a complex code signal $$s_{code}(t)=\Sigma \overline{C}_n\{p_{vi}(t-nT_i)+jp_{vq}(t-nT_i)\}$$

where $\overline{C}_n$ is zero for all symbols corresponding to data signals and non-zero for all symbols corresponding to synchronization signals.

For $\omega=\omega_{in}-\omega_{offset}$ to $\omega_{in}+\omega_{offset}$ step $$0.5\frac{\pi}{T_i}$$

Create a complex mixing signal $$s_{mix}=\cos(\omega t)+j\sin(\omega t), t=[0\ldots T_i]$$

Combine the incident signal s(t) and the mixing signal
$s_{mix}(t) \; s_{comb}(t)=s(t)s_{mix}(t)$
Compute the correlation function $R(r)=s_{code}*s_{comb}(\tau)$
If $\max_\tau|R(\tau)|>R_{max}$, $$R_{max}\leftarrow \max_\tau|R(\tau)|, R_{store}(\tau)=R(\tau)$$

Next $\omega$

Upon exit from the process, $R_{store}(\tau)$ will store the correlation between the incident signal s(t) and the complex code signal $s_{code}(t)$. $R_{store}(\tau)$ may be further refined by searching over smaller steps of $\omega$. The initial step size for $\omega$ must be less then half the Nyquist rate $$\frac{2\pi}{T_i}.$$

In the absence of multipath, the time offset $\tau$ that produces the maximum correlation output is used as the pseudorange. In the presence of multipath, mitigation strategies can be employed to select the proper time offset $\tau$.

A technique for generating the non-coherent correlation in software is now described. This approach emulates the hardware receivers of FIGS. 4 and 5. Note that while the I and Q channels are treated separately in the block diagrams, the I and Q components may be combined to generate the mixing signal in software. Since the non-coherent correlator uses envelope detection, it is not necessary to search over a range of intermediate frequencies. The process implements the pseudocode listed below.

Create the in-phase and quadrature code signals $c_i(t)=\Sigma \overline{C}_n p_{vi}(t-nT_i)$, $c_q(t)=\Sigma \overline{C}_n p_{vq}(t-nT_i)$ where the sum is over n, $\overline{C}_n$ is zero for all symbols corresponding to data signals and non-zero for all symbols corresponding to synchronization signals. Note that $c_i$ has autocorrelation $R_i$, $c_q$ has autocorrelation $R_q$, and that their cross-correlation is $R_{iq}$.

For $\tau=0$ to $T_{per}$ step $T_{samp}$ where $T_{per}$ is the period of the code being used, and $T_{samp}$ is the sample interval
Create a reference code mixing signal $$s_{mix}(t)=c_i(t+\tau)\cos(\omega t+vt+\phi)+c_q(t-\tau)\sin(\omega t+vt+\phi)$$

where $\omega$ is the nominal IF frequency of the incident signal, $v$ is the frequency offset of the mixing signal relative to the incident signal, and $\phi$ is the phase offset of the mixing signal from the incident signal.

Combine the incident signal s(t) and the reference code mixing signal $s_{mix}(t)$. $s_{comb}=s(t)s_{mix}$
Low-pass filter $s_{comb}(t)$ to generate $s_{filt}(t)$ such that the expected value of $s_{filt}(t)$ is given by $E[s_{filt}(t)]=2R_i(\tau)\cos(vt+\phi)+2R_{iq}(\tau)\sin(vt+\phi)$ where we have used that fact that $R_i(\tau)=-R_q(\tau)$
Perform envelope detection on $s_{filt}(t)$ (for example, by squaring and filtering) to generate the non-coherent correlation: $z(\tau)=2[R_i(\tau)^2+R_{iq}(\tau)^2]$
Next $\tau$ In the absence of multipath, the time offset $\tau$ that produces the maximum correlation output is used as the pseudorange. In the presence of multipath, mitigation strategies can be employed to select the proper time offset $\tau$.

Notice that the non-coherent correlation $z(\tau)$ makes use of the signal power in both the in-phase and quadrature components. However, as a result of this, the effective bandwidth of the signal that generates the non-coherent correlation is halved.

Embodiments of the disclosure can be implemented in digital electronic circuitry, or in computer hardware, firmware, software, or in combinations of them. Embodiments of the disclosure can be implemented in a computer program product tangibly embodied in a machine-readable storage device for execution by a programmable processor; and method steps of the disclosure can be performed by a programmable processor executing a program of instructions to perform functions of the disclosure by operating on input data and generating output. The disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the disclosure have been described. Nevertheless, it will be understood that various modifications may be made without departing from the spirit and scope of the disclosure. Accordingly, other implementations are within the scope of the following claims.

What is claimed is:

1. An apparatus to determine the position of a user terminal, comprising:
   a receiver configured to receive at the user terminal an American Television Standards Committee Mobile/Handheld (ATSC-M/H) broadcast signal from a ATSC-M/H transmitter;
   a pseudorange module configured to determine a pseudorange between the receiver and the ATSC-M/H transmitter based on the ATSC-M/H broadcast signal; and
   a position module configured to determine the position of the user terminal based on the pseudorange and a location of the ATSC-M/H transmitter;
   wherein the position module is configured to determine a clock offset between a local time reference in the user terminal and a master time reference, and to determine the position of the user terminal based on the pseudorange, the location of the ATSC-M/H transmitter, and the clock offset;
   wherein the pseudorange module comprises at least one of: (1) a correlator configured to correlate a stored portion of the ATSC-M/H broadcast signal with a signal generated by the user terminal; and (2) a correlator configured to correlate the ATSC-M/H broadcast signal with a signal generated by the user terminal as the ATSC-M/H broadcast signal is received;
   wherein the user terminal includes a clock that is not stabilized or corrected using a signal from a cellular base station or ATSC-M/H transmitter, such that the clock offset, T, is a function of time, T(t); and
   wherein the apparatus is configured to project pseudorange measurements to a common instant of time, t0, using the following steps:
       measuring, at a first time, t1, a first pseudorange, pr1(t1), with respect to a first transmitter, wherein the first pseudorange is representable as $pr1(t1)=r1+T(t1)$, where r1 represents a distance between the first transmitter and the receiver at time t1 and T(t1) represents the clock offset at time t1;
       measuring, at a second time, t2, a second pseudorange, pr2(t2), with respect to a second transmitter, wherein the second pseudorange is representable as $pr2(t2)=r2+T(t2)$, where r2 represents a distance between the second transmitter and the receiver at time t2 and T(t2) represents the clock offset at time t2;
       measuring, at a third time, t1+Δ, a second instance of the first pseudorange, pr1(t1+Δ), wherein Δ represents a small time increment and the second instance of the first pseudorange is representable as $pr1(t1+\Delta)=r1+T(t1)+[\partial T/\partial t]\Delta$;
       measuring, at a fourth time, t2+Δ, a second instance of the second pseudorange, pr2(t2+Δ), wherein the second instance of the second pseudorange is representable as $pr2(t2+\Delta)=r2+T(t2)+[\partial T/\partial t]\Delta$;
       computing a first projection of the first pseudorange to the common instant of time, t0, wherein the first projection of the first pseudorange is representable as: $pr1(t0)=pr1(t1)+[pr1(t1+\Delta)-pr1(t1)](t0-t1)/\Delta$; and
       computing a second projection of the second pseudorange to the common instant of time, t0, wherein the second projection of the second pseudorange is representable as: $pr2(t0)=pr2(t2)+[pr2(t2+\Delta)-pr2(t2)](t0-t2)/\Delta$.

2. The apparatus of claim 1, wherein the pseudorange module comprises:
   a memory to store a portion of the ATSC-M/H broadcast signal; and
   a correlator to correlate the stored portion with a signal generated by the user terminal.

3. The apparatus of claim 1, wherein the pseudorange module comprises:
   a correlator to correlate the ATSC-M/H broadcast signal with a signal generated by the user terminal as the ATSC-M/H broadcast signal is received.

4. A method for determining the position of a user terminal, comprising:
   receiving at the user terminal an American Television Standards Committee Mobile/Handheld (ATSC-M/H) broadcast signal from a ATSC-M/H transmitter; and
   determining a pseudorange between the receiver and the ATSC-M/H transmitter based on the ATSC-M/H) broadcast signal; and
   determining the position of the user terminal based on the pseudorange and a location of the ATSC-M/H transmitter;
   wherein the ATSC-M/H broadcast signal includes a training sequence;
   wherein the pseudorange is determined based on the training sequence;
   wherein an offset between a local time reference in the user terminal and a master time reference is determined, and the position of the user terminal is determined based on the pseudorange, the location of the ATSC-M/H transmitter, and the offset;
   wherein measurements at the user terminal are projected to a common instant in time; and
   wherein the user terminal includes a clock that is not stabilized or corrected using a signal from a cellular base station or ATSC-M/H transmitter, such that the clock offset, T, is a function of time, T(t); and
   wherein the method further includes projecting pseudorange measurements to a common instant of time, t0, using the following steps:
       measuring, at a first time, t1, a first pseudorange, pr1(t1), with respect to a first transmitter, wherein the first pseudorange is representable as $pr1(t1)=r1+T(t1)$, where r1 represents a distance between the first transmitter and the receiver at time t1 and T(t1) represents the clock offset at time t1;
       measuring, at a second time, t2, a second pseudorange, pr2(t2), with respect to a second transmitter, wherein the second pseudorange is representable as $pr2(t2)=$ r2+T(t2), where r2 represents a distance between the second transmitter and the receiver at time t2 and T(t2) represents the clock offset at time t2;

measuring, at a third time, t1+$\Delta$, a second instance of the first pseudorange, pr1(t1+$\Delta$), wherein $\Delta$ represents a small time increment and the second instance of the first pseudorange is representable as pr1(t1+$\Delta$)=r1+T(t1)+[$\partial$T/$\partial$t]$\Delta$;

measuring, at a fourth time, t2+$\Delta$, a second instance of the second pseudorange, pr2(t2+$\Delta$), wherein the second instance of the second pseudorange is representable as pr2(t2+$\Delta$)=r2+T(t2)+[$\partial$T/$\partial$t]$\Delta$;

computing a first projection of the first pseudorange to the common instant of time, t0, wherein the first projection of the first pseudorange is representable as: pr1(t0)=pr1(t1)+[pr1(t1+$\Delta$)−pr1(t1)](t0−t1)/$\Delta$; and computing a second projection of the second pseudorange to the common instant of time, t0, wherein the second projection of the second pseudorange is representable as: pr2(t0)=pr2(t2)+[pr2(t2+$\Delta$)−pr2(t2)](t0−t2)/$\Delta$.

5. The method of claim 4, further comprising:
storing a portion of the ATSC-M/H broadcast signal; and
correlating the stored portion with a signal generated by the user terminal.

6. The method of claim 4, further comprising:
correlating the ATSC-M/H broadcast signal with a signal generated by the user terminal as the ATSC-M/H broadcast signal is received.

7. A non transitory computer-readable media embodying instructions executable by a computer to perform a method for determining the position of a user terminal, the method comprising:

determining a pseudorange between a receiver and an American Television Standards Committee Mobile/Handheld (ATSC-M/H) transmitter based on a ATSC-M/H broadcast signal received at the user terminal from the ATSC-M/H transmitter; and determining the position of the user terminal based on the pseudorange and a location of the ATSC-M/H transmitter;

wherein an offset between a local time reference in the user terminal and a master time reference is determined, and the position of the user terminal is determined based on the pseudorange, the location of the ATSC-M/H transmitter, and the offset;

wherein measurements at the user terminal are projected to a common instant in time; and wherein the user terminal includes a clock that is not stabilized or corrected using a signal from a cellular base station or ATSC-M/H transmitter, such that the clock offset, T, is a function of time, T(t); and wherein the method further includes projecting pseudorange measurements to a common instant of time, t0, using the following steps:

measuring, at a first time, t1, a first pseudorange, pr1(t1), with respect to a first transmitter, wherein the first pseudorange is representable as pr1(t1)=r1+T(t1), where r1 represents a distance between the first transmitter and the receiver at time t1 and T(t1) represents the clock offset at time t1;

measuring, at a second time, t2, a second pseudorange, pr2(t2), with respect to a second transmitter, wherein the second pseudorange is representable as pr2(t2)=r2+T(t2), where r2 represents a distance between the second transmitter and the receiver at time t2 and T(t2) represents the clock offset at time t2;

measuring, at a third time, t1+$\Delta$, a second instance of the first pseudorange, pr1(t1+$\Delta$), wherein $\Delta$ represents a small time increment and the second instance of the first pseudorange is representable as pr1(t1+$\Delta$)=r1+T(t1)+[$\partial$T/$\partial$t]$\Delta$;

measuring, at a fourth time, t2+$\Delta$, a second instance of the second pseudorange, pr2(t2+$\Delta$), wherein the second instance of the second pseudorange is representable as pr2(t2+$\Delta$)=r2+T(t2)+[$\partial$T/$\partial$t]$\Delta$;

computing a first projection of the first pseudorange to the common instant of time, t0, wherein the first projection of the first pseudorange is representable as: pr1(t0)=pr1(t1)+[pr1(t1+$\Delta$)−pr1(t1)](t0−t1)/$\Delta$; and computing a second projection of the second pseudorange to the common instant of time, t0, wherein the second projection of the second pseudorange is representable as: pr2(t0)=pr2(t2)+[pr2(t2+$\Delta$)−pr2(t2)](t0−t2)/$\Delta$.

8. The non transitory computer-readable media of claim 7: wherein determining the position of the user terminal comprises:

determining an offset between a local time reference in the user terminal and a master time reference, and determining the position of the user terminal based on the pseudorange, the location of the ATSC-M/H transmitter, and the offset.

9. The non transitory computer-readable media of claim 7, wherein the method further comprises:

storing a portion of the ATSC-M/H broadcast signal; and
correlating the stored portion with a signal generated by the user terminal.

10. The non transitory computer-readable media of claim 7, wherein the method further comprises:

correlating the ATSC-M/H broadcast signal with a signal generated by the user terminal as the ATSC-M/H broadcast signal is received.

11. The apparatus of claim 1, wherein the position of the user terminal is determined by a position module of a location server remote from the user terminal.

12. The apparatus of claim 11, wherein the location server is configured to inform the user terminal of the best ATSC-M/H channels to monitor.

13. The apparatus of claim 12, wherein the user terminal is further configured to exchange messages with the location server via a base station and to select ATSC-M/H channels to monitor based on an identity of the base station and a stored table correlating base stations and ATSC-M/H channels.

14. The apparatus of claim 11, wherein the user terminal is further configured to accept a location input from a user that gives a general indication of the area, and to use this information to select ATSC-M/H channels for processing.

15. The apparatus of claim 11, wherein the user terminal is further configured to scan available ATSC-M/H channels, assemble a location fingerprint based on power levels of the available ATSC-M/H channels, compare the location fingerprint to a stored table, and select ATSC-M/H channels for processing based on the comparison.

16. The apparatus of claim 11, wherein the user terminal is further configured to determine a pseudorange between the user terminal and the ATSC-M/H transmitter, wherein the pseudorange represents a time difference or equivalent distance between a time of transmission from a transmitter of a component of the ATSC-M/H broadcast signal and a time of reception at the user terminal of the component, as well as a clock offset at the user terminal.

17. The apparatus of claim 16, wherein the user terminal is further configured to transmit the pseudorange to the location server; and wherein the location server is configured to receive information describing a phase center of each ATSC-M/H transmitter.

18. The apparatus of claim 17, wherein the location server is further configured to receive weather information describing air temperature, atmospheric pressure, and humidity in a vicinity of the user terminal.

19. The apparatus of claim 18, wherein the location server is further configured to determine tropospheric propagation velocity from the weather information.

20. The apparatus of claim 13, wherein the location server is further configured to receive from the base station information identifying a general geographic location of the user terminal, wherein the information includes an identity of a cell or cell sector, said information being useful for ambiguity resolution.

21. The apparatus of claim 19, wherein the location server is further configured to adjust the value of a pseudorange according to a tropospheric propagation velocity and time offset for a corresponding ATSC-M/H transmitter.

22. The apparatus of claim 11, wherein the transmission times for individual ATSC-M/H transmitters include fixed offsets, and the offsets are stored and passed to the user terminal as needed.

23. The apparatus of claim 11, wherein the user terminal is configured to make measurements of ATSC-M/H signals sufficient to compute pseudorange, and to transmit these measurements to the location server for computation of pseudoranges.

24. The apparatus of claim 11, wherein the apparatus is further configured to determine position based on information concerning a time offset between a local clock of each ATSC-M/H transmitter and a reference clock, and information describing a phase center of each ATSC-M/H transmitter.

25. The apparatus of claim 24, wherein the apparatus is further configured to receive tropospheric propagation velocity computed by the location server.

26. The apparatus of claim 25, wherein the apparatus is further configured to receive weather information describing air temperature, atmospheric pressure, and humidity in a vicinity of the user terminal and to determine tropospheric propagation velocity from the weather information.

27. The apparatus of claim 11, wherein the user terminal is further configured to receive ATSC-M/H signals from a plurality of ATSC-M/H transmitters and to determine a pseudorange between the user terminal and each ATSC-M/H transmitter, and then to determine the user terminal's position based on the pseudoranges and phase centers of the transmitters.

28. A system, comprising:
a user terminal including a receiver configured to receive an American Television Standards Committee Mobile/Handheld (ATSC-M/H) broadcast signal from a ATSC-M/H transmitter;
a location server remote from the user terminal;
a pseudorange module configured to determine a pseudorange between the receiver and the ATSC-M/H transmitter based on the ATSC-M/H broadcast signal, wherein the ATSC-M/H broadcast signal includes a training sequence and the pseudorange module is configured to determine the pseudorange based on the training sequence; and
a position module configured to determine the position of the user terminal based on the pseudorange and a location of the ATSC-M/H transmitter, wherein, to determine the position of the user terminal, the position module determines an offset between a local time reference in the user terminal and a master time reference, and determines the position of the user terminal based on the pseudorange, the location of the ATSC-M/H transmitter, and the offset;
wherein the user terminal is configured to make measurements of ATSC-M/H signals sufficient to compute pseudorange, and to transmit these measurements to the location server for computation of pseudoranges;
wherein measurements at the user terminal are projected to a common instant in time;
wherein the pseudorange module comprises a correlator configured either (a) to correlate a stored signal portion with a signal generated by the user terminal, or (b) to correlate the ATSC-M/H broadcast signal with a signal generated by the user terminal as the ATSC-M/H broadcast signal is received;
wherein the user terminal includes a clock that is not stabilized or corrected using a signal from a cellular base station or ATSC-M/H transmitter, such that the clock offset, T, is a function of time, T(t); and
wherein the system is configured to project pseudorange measurements to a common instant of time, t0, using the following steps:
measuring, at a first time, t1, a first pseudorange, pr1(t1), with respect to a first transmitter, wherein the first pseudorange is representable as pr1(t1)=r1+T(t1), where r1 represents a distance between the first transmitter and the receiver at time t1 and T(t1) represents the clock offset at time t1;
measuring, at a second time, t2, a second pseudorange, pr2(t2), with respect to a second transmitter, wherein the second pseudorange is representable as pr2(t2)=r2+T(t2), where r2 represents a distance between the second transmitter and the receiver at time t2 and T(t2) represents the clock offset at time t2;
measuring, at a third time, t1+$\Delta$, a second instance of the first pseudorange, pr1(t1+$\Delta$), wherein $\Delta$ represents a small time increment and the second instance of the first pseudorange is representable as pr1(t1+$\Delta$)=r1+T(t1)+[$\partial$T/$\partial$t]$\Delta$;
measuring, at a fourth time, t2+$\Delta$, a second instance of the second pseudorange, pr2(t2+$\Delta$), wherein the second instance of the second pseudorange is representable as pr2(t2+$\Delta$)=r2+T(t2)+[$\partial$T/$\partial$t]$\Delta$;
computing a first projection of the first pseudorange to the common instant of time, t0, wherein the first projection of the first pseudorange is representable as: pr1(t0)=pr1(t1)+[pr1(t1+$\Delta$)−pr1(t1)](t0−t1)/$\Delta$; and
computing a second projection of the second pseudorange to the common instant of time, t0, wherein the second projection of the second pseudorange is representable as: pr2(t0)=pr2(t2)+[pr2(t2+$\Delta$)−pr2(t2)](t0−t2)/$\Delta$.

29. The system of claim 28, wherein the position module is part of the location server.

30. The system of claim 28, wherein the location server is configured to inform the user terminal of the best ATSC-M/H channels to monitor.

31. The system of claim 28, wherein the user terminal is further configured to exchange messages with the location server via a base station and to select ATSC-M/H channels to monitor based on an identity of base station and a stored table correlating base stations and ATSC-M/H channels.

32. The system of claim 28, wherein the user terminal is further configured to accept a location input from a user that gives a general indication of the area, and to use this information to select ATSC-M/H channels for processing.

33. The system of claim 28, wherein the user terminal is further configured to scan available ATSC-M/H channels, assemble a location fingerprint based on power levels of the available ATSC-M/H channels, compare the location fingerprint to a stored table, and select ATSC-M/H channels for processing based on the comparison.

34. The system of claim 28, wherein the user terminal is further configured to determine a pseudorange between the user terminal and the ATSC-M/H transmitter, wherein the pseudorange represents a time difference or equivalent distance between a time of transmission from a transmitter of a component of the ATSC-M/H broadcast signal and a time of reception at the user terminal of the component, as well as a clock offset at the user terminal.

35. The system of claim 34, wherein the user terminal is further configured to transmit the pseudorange to the location server; and wherein the location server is configured to receive information describing a phase center of each ATSC-M/H transmitter.

36. The system of claim 28, wherein the location server is further configured to receive weather information describing air temperature, atmospheric pressure, and humidity in a vicinity of the user terminal.

37. The system of claim 36, wherein the location server is further configured to determine tropospheric propagation velocity from the weather information.

38. The system of claim 28, wherein the location server is further configured to receive from a base station information identifying a general geographic location of the user terminal, wherein the information includes an identity of a cell or cell sector, said information being useful for ambiguity resolution.

39. The system of claim 37, wherein the location server is further configured to adjust the value of a pseudorange according to a tropospheric propagation velocity and time offset for a corresponding ATSC-M/H transmitter.

40. The system of claim 28, wherein the transmission times for individual ATSC-M/H transmitters include fixed offsets, and the offsets are stored and passed to the user terminal as needed.

41. The system of claim 28, wherein the system is configured to determine position based on information concerning a time offset between a local clock of each ATSC-M/H transmitter and a reference clock, and information describing a phase center of each ATSC-M/H transmitter.

* * * * *